United States Patent
Liu et al.

(10) Patent No.: US 11,624,947 B2
(45) Date of Patent: Apr. 11, 2023

(54) ELECTRONIC DEVICE AND CONTROL METHOD THEREOF

(71) Applicants: BEIJING BOE DISPLAY TECHNOLOGY CO., LTD, Beijing (CN); BOE TECHNOLOGY GROUP CO., LTD., Beijing (CN)

(72) Inventors: Bingyang Liu, Beijing (CN); Dongchuan Chen, Beijing (CN); Xueqiang Qian, Beijing (CN); Dan Wang, Beijing (CN); Xinli Ma, Beijing (CN); Hui Zhang, Beijing (CN)

(73) Assignees: BEIJING BOE DISPLAY TECHNOLOGY CO., LTD, Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 421 days.

(21) Appl. No.: 16/623,747

(22) PCT Filed: Apr. 12, 2019

(86) PCT No.: PCT/CN2019/082412
§ 371 (c)(1),
(2) Date: Dec. 17, 2019

(87) PCT Pub. No.: WO2020/151096
PCT Pub. Date: Jul. 30, 2020

(65) Prior Publication Data
US 2021/0405437 A1 Dec. 30, 2021

(30) Foreign Application Priority Data

Jan. 25, 2019 (CN) .......................... 201910074762.9

(51) Int. Cl.
*G02F 1/13* (2006.01)
*H04N 5/00* (2011.01)
(Continued)

(52) U.S. Cl.
CPC ...... *G02F 1/133388* (2021.01); *G02F 1/1337* (2013.01); *G02F 1/13306* (2013.01);
(Continued)

(58) Field of Classification Search
CPC ........... G02F 1/133388; G02F 1/13306; G02F 1/133512; H04N 5/2253
(Continued)

(56) References Cited

U.S. PATENT DOCUMENTS

2011/0292243 A1* 12/2011 Nagataki ............... H04N 5/2355
348/229.1
2017/0257559 A1* 9/2017 Stricker ........... H04N 5/232933
(Continued)

FOREIGN PATENT DOCUMENTS

CN 107249053 A 10/2017
CN 107613057 A 1/2018
(Continued)

OTHER PUBLICATIONS

State Intellectual Property Office of the People's Republic of China, Office Action and Search Report Issued in Application No. 201910074762.9, dated Sep. 24, 2020, 21 pages. (Submitted with Partial Translation).
(Continued)

*Primary Examiner* — Jeffery A Williams
(74) *Attorney, Agent, or Firm* — McCoy Russell LLP

(57) ABSTRACT

An electronic device and one or more control methods thereof are provided. In one example, the electronic device may include a display device, one or more imaging devices, and a signal processing device. The display device may include a display panel and a non-display area at an edge of the display panel, the non-display area having one or more light-passing structures. Each of the one or more imaging devices may correspond to one of the one or more light-
(Continued)

passing structures. Further, each of the one or more imaging devices may be disposed in an internal space of the electronic device. The signal processing device may be connected to each of the display device and the one or more imaging devices. The electronic device may increase an actual screen ratio of a rectangular image displayed on a user-oriented side of the electronic device.

18 Claims, 16 Drawing Sheets

(51) Int. Cl.
*G02F 1/1333* (2006.01)
*G02F 1/133* (2006.01)
*G02F 1/1335* (2006.01)
*G02F 1/1337* (2006.01)
*H04N 5/225* (2006.01)
*H04N 5/232* (2006.01)

(52) U.S. Cl.
CPC .. *G02F 1/133512* (2013.01); *G02F 1/133514* (2013.01); *G02F 1/133528* (2013.01); *H04N 5/2253* (2013.01); *H04N 5/2257* (2013.01); *H04N 5/23238* (2013.01); *H04N 5/23293* (2013.01)

(58) Field of Classification Search
USPC .......................................................... 348/38
See application file for complete search history.

(56) References Cited

U.S. PATENT DOCUMENTS

2018/0190190 A1\* 7/2018 Xi ........................ G09G 3/3208
2019/0384974 A1\* 12/2019 Twede ............... G06K 9/00617
2020/0220957 A1\* 7/2020 Liu ..................... H04M 1/0233

FOREIGN PATENT DOCUMENTS

| CN | 107770315 | A | 3/2018 |
| CN | 108600455 | A | 9/2018 |
| CN | 108681131 | A | 10/2018 |
| CN | 108717244 | A | 10/2018 |
| CN | 207968590 | U | 10/2018 |
| CN | 109068044 | A | 12/2018 |
| CN | 208257866 | U | 12/2018 |
| CN | 109212800 | A | 1/2019 |
| CN | 109246263 | A | 1/2019 |
| CN | 208384462 | U | 1/2019 |
| CN | 208386619 | U | 1/2019 |
| CN | 109581732 | A | 4/2019 |
| CN | 208956153 | U | 6/2019 |
| CN | 110536049 | A | 12/2019 |

OTHER PUBLICATIONS

ISA China National Intellectual Property Administration, International Search Report and Written Opinion Issued in Application No. PCT/CN2019/08212, dated Oct. 24, 2019, WIPO, 8 pages.
State Intellectual Property Administration of the People's Republic of China, Office Action and Search report Issued in Application No. 201910074762.9, dated Mar. 23, 2020, 28 pages. (Submitted with Partial Translation).

\* cited by examiner

ELECTRONIC DEVICE AND CONTROL METHOD THEREOF

CROSS-REFERENCE TO RELATED APPLICATIONS

The present application is a U.S. National Phase of International Patent Application Serial No. PCT/CN2019/082412 entitled "ELECTRONIC DEVICE AND CONTROL METHOD THEREOF," filed on Apr. 12, 2019. International Patent Application Serial No. PCT/CN2019/082412 claims priority from Chinese Patent Application No. 201910074762.9, filed on Jan. 25, 2019, The entire contents of each of the above-referenced applications are incorporated herein by reference for all purposes.

TECHNICAL FIELD

The present description relates generally to the field of display technologies, and embodiments of an electronic device and one or more control methods thereof.

BACKGROUND

User-oriented sides, or interfaces, of display devices, such as smartphones, are most commonly rectangular. For optimal visual experience, it is desirable that an effective display area (e.g., screen) occupies as much of the user-oriented side of the display device as possible, providing a full-screen display. However, other features (e.g., buttons, distance sensors, earpieces, microphones, front-facing cameras) of the display device may also be present on the user-oriented side, which occupy at least a portion of available space. In such cases, the effective display area may be reduced by a threshold area required to present/contain the other features disposed at the side of the display. This may result in an irregular shape and reduced size of the effective display area. In certain cases, in order to restrict the effective display area to a rectangular shape, the effective display area may further be reduced beyond the threshold area required for the other features, resulting in a suboptimal screen ratio. In any of these examples, an occupation, or actual screen ratio, of the effective display area to a total area of the user-oriented side is lower than full-screen occupation. Full-screen occupation refers to when the effective display area is equivalent to a total display area of the user-oriented side.

SUMMARY

Embodiments of an electronic device proposed herein may include a display panel and a non-display area surrounding an edge of the display panel. The non-display area may be provided with a light-passing structure so that incident light may be transmitted to an internal space, or an inside, or an interior, of the electronic device disposed under the display panel. Further, an imaging device (e.g., camera) may be disposed on a light-emitting side of the light-passing structure, that is, within the internal space of the electronic device, so that light emitted by the light-passing structure may be further transmitted to the imaging device underneath the display panel for imaging, thereby realizing an imaging, or image-capturing, or shooting, or photographing, function. The imaging device may utilize the focusing of incident light in an aperture to condense a spot size of the incident light into the imaging device within the internal space of the electronic device and under the display panel. Thus, the threshold area for front-facing features and the irregular shape and/or reduced size of the effective display area may be precluded, thereby increasing the occupation, or actual screen ratio, of a rectangular image displayed on the user-oriented side of the electronic device.

An embodiment of the present disclosure provides an electronic device, comprising a display device, one or more imaging devices, and a signal processing device, wherein the display device comprises a display panel and a non-display area at an edge of the display panel, the non-display area having one or more light-passing structures, where each of the one or more light-passing structures comprises a light-emitting side facing an internal space of the electronic device, each of the one or more imaging devices respectively corresponds to one of the one or more light-passing structures, and is disposed on the light-emitting side of the corresponding light-passing structure, and the signal processing device is connected to each of the display device and the one or more imaging devices.

Another embodiment of the present disclosure provides a method of controlling the electronic device, the method comprising receiving an imaging instruction, receiving, by way of one or more light-passing structures, an incident light, transmitting the incident light to a light-emitting side of each of the one or more light-passing structures, converting, by way of one or more imaging devices, the incident light into one or more analog signals in response to the imaging instruction, receiving, by way of a signal processing device, the one or more analog signals output by the one or more imaging devices, processing, by way of the signal processing device, the one or more analog signals to obtain a display signal, transmitting, by way of the signal processing device, the display signal to a display device, and displaying, by way of the display device, an image according to the display signal.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the summary above does not constitute an admission that the technical problems and challenges discussed were known to anyone other than the inventors.

DETAILED DESCRIPTION

The following description relates to an electronic device and one or more control methods thereof. The specific embodiments of the present invention will be described in detail below with reference to the accompanying figures. It is to be understood that the specific embodiments described herein are merely illustrative and not restrictive.

Figure 1:
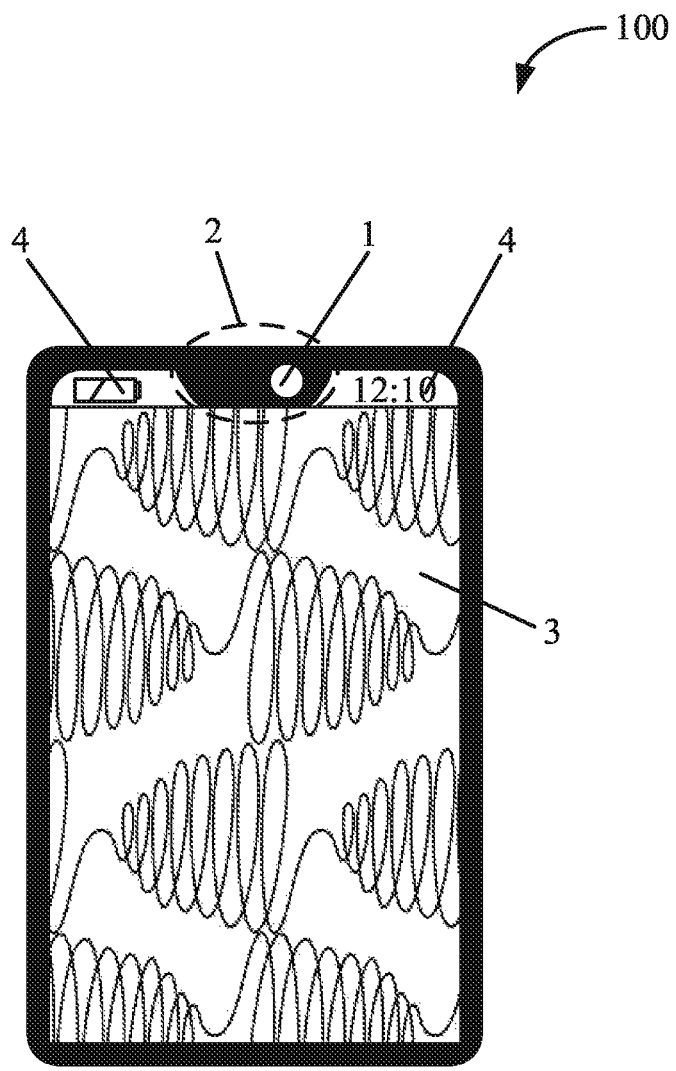
FIG. 1 shows a schematic diagram of a conventional electronic device provided with an interface for displaying a rectangular image.

Referring now to FIG. 1, a schematic diagram 100 of a conventional electronic device is depicted. The conventional electronic device includes a front imaging device 1 (e.g., front-facing camera) disposed in a front imaging area 2. The conventional electronic device displays a rectangular image 3 and a side display area 4 on a display screen, where the side display area 4 is adjacent to, and shaped around, the front imaging area 2.

In order to ensure function of the front imaging device 1, the front imaging area 2 is positioned so as to take up a threshold area, wherein further irregular space not utilized by the front imaging area 2 defines the side display area 4. As such, the front imaging area 2 is set apart from the display screen on a user-oriented side of the conventional electronic device. Accordingly, the display screen may be cut into an irregular, non-rectangular shape, which accommodates the front imaging area 2 while also accounting for the side display area 4.

In practical applications, when displaying a rectangular image 3 such as a video, a game, a photo, or the like, in order to ensure complete, non-distorted display, the rectangular image 3 is displayed separately and apart from the front imaging area 2. The side display area 4 is typically utilized to display system information, such as time and/or power, and does not participate in displaying the rectangular image 3. Therefore, an actual screen ratio of the conventional electronic device when displaying the rectangular image 3 is relatively low in order to accommodate the front imaging area 2.

Figure 2:
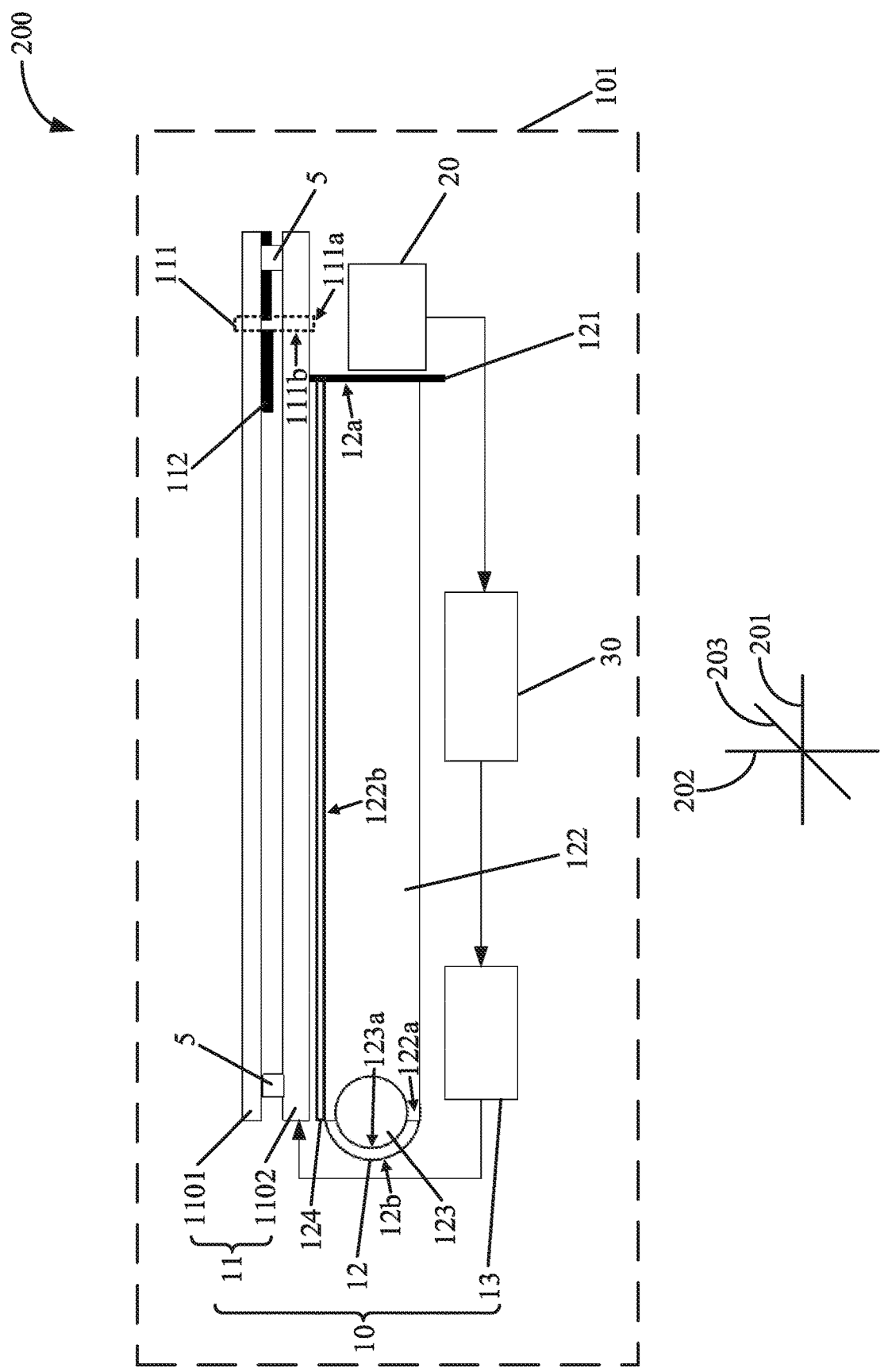
FIG. 2 shows a cross-sectional view of an electronic device including a display device, one or more imaging devices, and a signal processing device, according to an embodiment of the present disclosure.

As such, and as will be described below with reference to FIGS. 2-14, an electronic device is provided by an embodiment of the present disclosure. Referring now to FIG. 2, a cross-sectional view 200 of an electronic device 101 is depicted. The electronic device 101 at least includes a display device 10, one or more imaging devices 20, and a signal processing device 30. In some examples, the one or more imaging devices 20 may be one or more image-capturing, or camera, devices. Mutually perpendicular axes 201, 202, and 203 define a three-dimensional space for the cross-sectional view 200, where the axis 201 and the axis 202 define a plane of FIG. 2 and the axis 203 is normal to the plane of FIG. 2. It will be appreciated that FIGS. 4-14 and 16 (described in more detail below) are depicted in the same plane as FIG. 2, though, in some examples, varying in orientation. It will further be appreciated that FIGS. 3, 17, and 18 (described in more detail below) are depicted in a plane which is perpendicular to the plane of FIG. 2.

The display device 10 at least includes a display panel 11 having a non-display area, such as the non-display area 103 described hereinbelow with reference to FIG. 3, at an edge of the display panel 11 having one or more light-passing structures 111, where a light-emitting side 111a of each of the one or more light-passing structures 111 faces an internal space, or an inside, of the electronic device 101. The one or more light-passing structures 111 transmit an incident light to the light-emitting side 111a of each of the one or more light-passing structures 111. In some examples, each of the one or more light-passing structures 111 may be effectively equivalent to a relatively small light-transmitting aperture, or hole. Therefore, the one or more light-passing structures 111 may be used to introduce the incident light emitted or reflected by an object into the electronic device 101 through the one or more light-passing structures 111, and may then be transmitted to one or more devices therein (e.g., the one or more imaging devices 20) for imaging to realize an imaging, or image-capturing, or shooting, or photographing, function. In addition, the display device 10 displays an image in accordance with a display signal, or a first display signal, transmitted by the signal processing device 30. In some examples, the display device 10 may display one or more images in accordance with one or more display signals transmitted by the signal processing device 30.

The one or more imaging devices 20 are disposed in one-to-one correspondence with the one or more light-passing structures 111. Said another way, each of the one or more imaging devices 20 respectively correspond to one of the one or more light-passing structures 111. Further, each of the one or more imaging devices 20 are disposed on the light-emitting side 111a of the corresponding light-passing structure 111. That is, each of the one or more imaging devices 20 is correspondingly disposed on the light-emitting side 111a of each of the one or more light-passing structures 111. As such, each of the one or more imaging devices 20 may collect light required for imaging through the corresponding light-passing structure 111. Each of the one or more imaging devices are positioned to receive the incident light output by the corresponding light-passing structure 111, and thereby convert the incident light into one or more analog signals, or first analog signals, in response to an imaging instruction. In some examples, the one or more analog signals may be a plurality of analog signals.

The signal processing device 30 is connected to each of the display device 10 and the one or more imaging devices 20. The signal processing device 30 is positioned to receive the one or more analog signals output by any one of the one or more imaging devices 20, process the one or more analog signals to obtain the display signal, and transmit the display signal to the display device 10.

The one or more light-passing structures 111 are disposed in the non-display area, such as the non-display area 103 described hereinbelow with reference to FIG. 3, at the edge of the display panel 11. The incident light may be transmitted interiorly to the inside of the electronic device 101 through the one or more light-passing structures 111, and each of the one or more imaging devices 20 is disposed on the light-emitting side 111a of the corresponding light-passing structure facing the inside of the electronic device 101, that is, the internal space of the electronic device 101 disposed under the display panel 11. As such, the incident light output from the one or more light-passing structures 111 may be further transmitted to the one or more imaging devices 20 under the display panel 11 for imaging to realize the imaging function. Thus, there is no need to reserve a front imaging area for placing the one or more imaging devices 20 on a user-oriented side of the electronic device 101. Herein, the term "interiorly" may refer to being in a position or direction more away from a periphery or perimeter and more towards a center of a user-facing side of the electronic device 101, that is, the internal space of the electronic device 101 disposed under the display panel 11.

Figure 3:
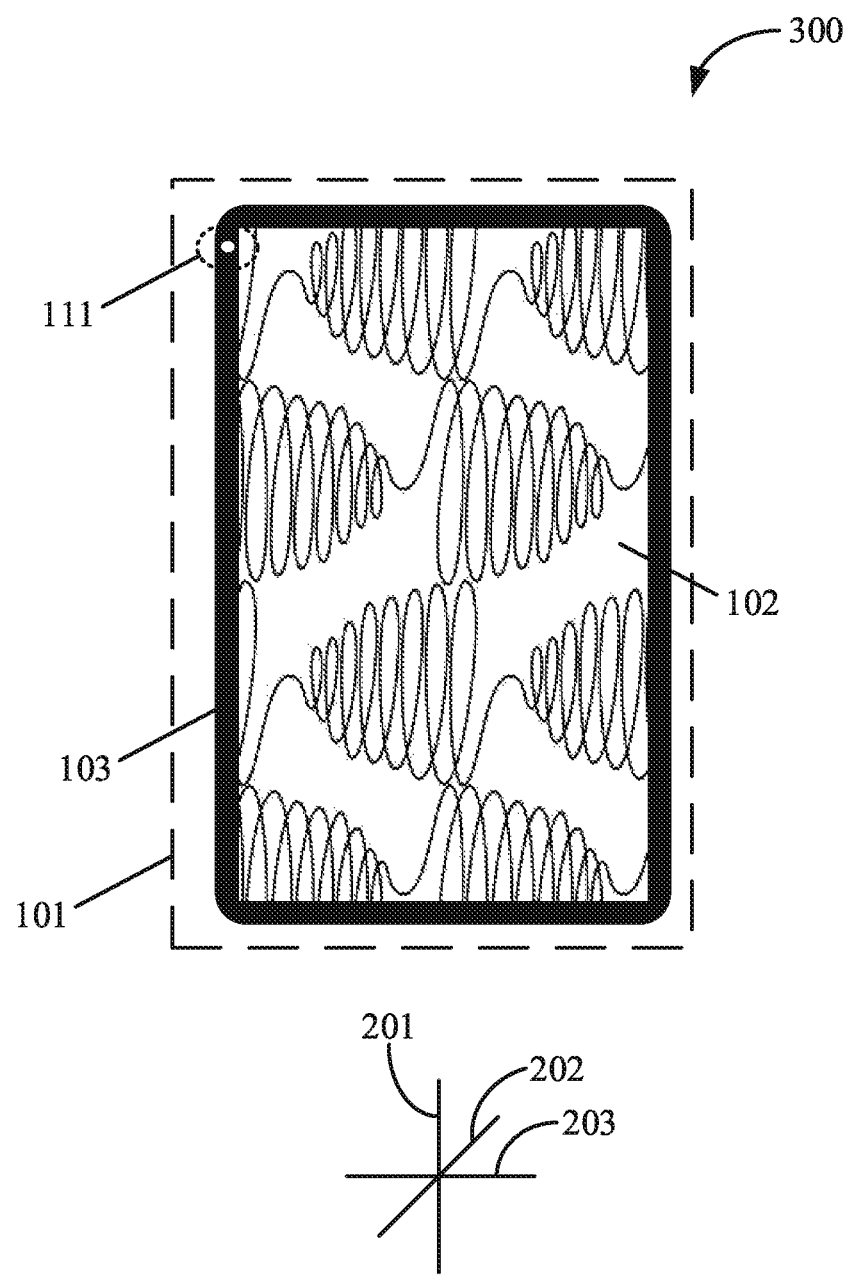
FIG. 3 shows a schematic diagram of an electronic device provided with an interface for displaying a rectangular image.

Referring now to FIG. 3, a schematic diagram 300 of the electronic device 101 is depicted. The electronic device 101 is provided with an interface, such as the display panel (e.g., 11), for displaying a rectangular image in a display area 102. The electronic device 101 further includes the one or more light-passing structures 111 and the non-display area 103 disposed around the edge of the interface. The one or more light-passing structures 111 transmit the incident light to the inside of the electronic device 101.

In some examples, each of the one or more light-passing structures 111 may be effectively equivalent to a relatively small light-transmitting aperture. Thus, as shown in FIGS. 2 and 3, a size of each of the one or more light-passing structures 111 on the user-oriented side of the electronic device 101 may be smaller than a size of each of the one or more imaging devices 20. Accordingly, the one or light-passing structures may be disposed through the non-display area 103 at the edge of the display panel 11 and each of the one or more imaging devices 20 may be disposed on the light-emitting side 111a of the corresponding light-passing structure 111 facing the inside of the electronic device 101. As a result, a front imaging area may be eliminated, and the rectangular image may be displayed using a maximum portion of the user-facing side of the electronic device 101. Correspondingly, the actual screen ratio when the electronic device 101 displays the rectangular image may be increased, thereby obtaining a better visual experience and display effect.

Further, since it is unnecessary to provide a front imaging area, in a manufacturing process of the display panel 11, it is correspondingly unnecessary to perform a special shape cutting of the display panel 11, thereby reducing a complexity of manufacturing the display panel 11.

Figure 4:
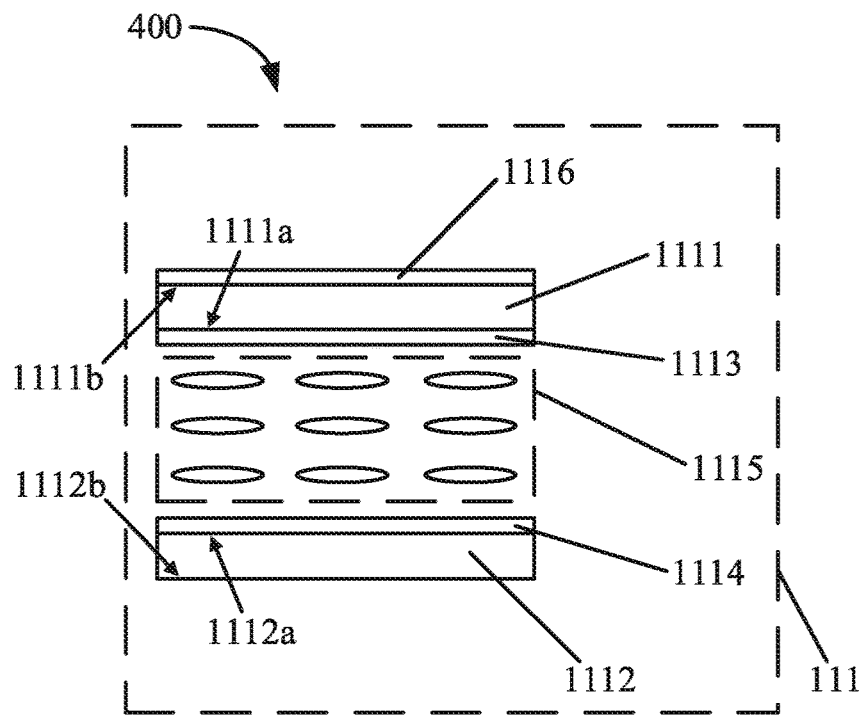
FIG. 4 shows a cross-sectional view of a light-passing structure of the electronic device.

Referring now to FIG. 4, a cross-sectional view 400 of one of the one or more light-passing structures 111 of the electronic device (e.g., 101) is depicted. The light-passing structure 111 at least includes a first base substrate, or first substrate, 1111, a second base substrate, or second substrate, 1112, a first alignment film 1113 formed on a side 1111a of the first base substrate 1111 facing the second base substrate 1112, and a second alignment film 1114 formed on a side 1112a of the second base substrate 1112 facing the first base substrate 1111, a liquid crystal layer 1115 disposed between the first alignment film 1113 and the second alignment film 1114, and a target polarizer 1116. In some examples, each of the first alignment film 1113 and the second alignment film 1114 may fix an alignment of liquid crystal molecules in the liquid crystal layer 1115. In some examples, and as shown in FIG. 4, the target polarizer 1116 may be disposed on a side 1111b of the first base substrate 1111 facing away, or opposite, from the second base substrate 1112. In further examples, the target polarizer 1116 may be disposed on a side 1112b of the second base substrate 1112 facing away, or opposite, from the first base substrate 1111.

In some examples, and as shown in FIG. 2, the display panel 11 may include a color filter substrate 1101 and an array substrate 1102. Further, the color filter substrate 1101 and the array substrate 1102 may be connected by a plastic frame, or bezel, 5, which may hold and separate the color filter substrate 1101 and the array substrate 1102. In examples where the first base substrate 1111 is a base, or support, substrate of the color filter substrate 1101, the second base substrate 1112 is a base, or support, substrate of the array substrate 1102. In examples where the first base substrate 1111 is the base substrate of the array substrate 1102, the second base substrate 1112 is the base substrate of the color filter substrate 1101.

It should be appreciated that, for convenience of description, in the example depicted by FIG. 4, the first base substrate 1111 may be considered to be the base substrate of the color filter substrate 1101, and the second base substrate 1112 may be considered to be the base substrate of the array substrate 1102.

Referring now to FIGS. 2 and 4, the color filter substrate 1101 may further include a black matrix 112. The black matrix 112 is provided with one or more through holes for respectively forming the one or more light-passing structures 111. In some examples, an outer diameter of each of the one or more through holes is greater than or equal to 5 μm and less than or equal to 20 μm. In some examples, the outer diameter of each of the one or more through holes is greater than or equal to 10 μm and less than or equal to 20 μm. In some examples, the outer diameter of each of the one or more through holes is greater than or equal to 10 μm and less than or equal to 15 μm. Since the black matrix 112 may block the incident light, when one of the one or more light-passing structures 111 are prepared in the non-display area (e.g., 103) at the edge of the display panel 11, a through hole may be formed in the black matrix 112 located in the non-display area 103. As such, the incident light emitted or reflected by an object may enter the electronic device 101 by way of the through hole in the black matrix 112 without being blocked by the black matrix 112. In some examples, the black matrix 112 having the one or more through holes may be formed on the base substrate (e.g., the first base substrate 1111) of the color filter substrate 1101 by a mask process. In some examples, a shape of the one or more through holes on the black matrix 112 may be circular in a cross-section coplanar with the plane defined by the axes 201 and 203. It should be appreciated that the cross-sectional shape of any one of the one or more through holes on the black matrix 112 should not be considered limited by the present disclosure, and may also be an ellipse, a rectangle, etc.

In some examples, various opaque metal wires, such as common electrode wires and the like, on the array substrate 1102 disposed in the non-display area (e.g., 103) may also block the incident light. As such, the metal wires may be disposed on the array substrate at positions avoiding the one or more through holes disposed on the black matrix 112 for transmission of the incident light emitted or reflected by an object to the inside of the electronic device 101. Said another way, a transparent region of the array substrate 1102 may be prepared such that the transparent region is free of the metal wires such that the incident light may be transmitted into the electronic device 101 by way of the transparent region of the array substrate 1102 without being blocked by the metal wires.

It will be appreciated by those skilled in the art that, since the incident light passes through the one or more light-passing structures 111 at different angles, the incident light may first be concentrate into a light intersection, and then dispersed and emitted into the one or more light-passing structures 111. As such, a spot size of the incident light at the one or more through holes of the black matrix 112 receiving the incident light will be smaller than a spot size of the incident light on the second base substrate 1112. In one example, a size of the one or more through holes of the black matrix 112 receiving the incident light may be the same as a size of the transparent region of the array substrate 1102 avoided by the metal wires. Further, each of the size of the one or more through holes of the black matrix 112 receiving the incident light and the size of the transparent region of the array substrate 1102 may be greater than or equal to a maximum spot size which may be received on the second base substrate 1112. In a further example, the size of the one or more through holes of the black matrix 112 receiving the incident light may be greater than or equal to a maximum spot size which may pass through the one or more through holes, and the size of the transparent region of the array substrate 1102 avoided by the metal wires may be greater than or equal to the maximum spot size which may be received on the second base substrate 1112. That is, the size of the one or more through holes of the black matrix 112 receiving the incident light may be smaller than the size of the transparent region on the array substrate 1102 avoiding the metal wires. As such, a presence of the one or more light-passing structures 111 may be more difficult to observe on the user-oriented side of the electronic device 101.

In conventional embodiments, the display panel 11 typically includes a first polarizer disposed on the side 1111b of the first base substrate 1111 facing away, or opposite, from the second base substrate 1112, and a second polarizer disposed on the side 1112b of the second base substrate 1112 facing away, or opposite, from the first base substrate 1111. Further, the first polarizer and the second polarizer are typically disposed orthogonally with respect to one another, such that directions of waves of polarized light which the first polarizer and the second polarizer respectively allow to pass are perpendicular to one another. However, the first polarizer and the second polarizer being disposed orthogonally in the manner described above may block light from entering the inside of the electronic device 101. As such, during a manufacturing process of each of the one or more light-passing structures 111, the one or more through holes for forming the one or more light-passing structures 111 may be disposed on the first polarizer or the second polarizer, so that the incident light emitted or reflected by an object may be transmitted through the one or more through holes on the first polarizer or the second polarizer without being blocked by the orthogonal arrangement of the first polarizer and the second polarizer.

As such, in some examples of an embodiment of the present disclosure, the target polarizer 1116 may be considered a first polarizer of the color filter substrate 1101. That is, the one or more through holes for respectively forming the one or more light-passing structures 111 may be disposed on a second polarizer of the array substrate 1102, and no through holes are formed on the target polarizer 1116. Thus, the incident light may pass through the target polarizer 1116 and the one or more through holes on the second polarizer of the array substrate 1102 to enter the inside of the electronic device 101.

In some examples, since there may be a risk of light leakage in a liquid crystal layer of the display panel 11, a small amount of light may leak toward the one or more light-passing structures 111. The target polarizer 1116 may be manufactured without through holes so as to, in part, prevent the small amount of light from leaking out of the liquid crystal layer of the display panel 11, thereby preventing said light from affecting the display effect of the display panel 11.

In some examples, since the target polarizer 1116 is closer to an outside of the electronic device 101, if the one or more though holes are provided in the target polarizer 1116, then the one or more through holes may be more easily observed by a user of the electronic device 101. As such, the one or more through holes may be disposed on the second polarizer of the array substrate 1102, and the target polarizer may be manufactured without through holes, so that the one or more light-passing structures 111 may be obscured in the non-display area (e.g., 103) of the electronic device 101.

In some examples, the target polarizer 1116 may be considered the second polarizer of the array substrate 1102, that is, the one or more through holes respectively forming the one or more light-passing structures 111 may be disposed on the first polarizer of the color filter substrate 1101, and no through holes are formed on the target polarizer 1116. Thus, the incident light may pass through the one or more through holes on the first polarizer of the color filter substrate 1101 and the target polarizer 1116 to enter the inside of the electronic device 101.

In some examples, in the display panel 11, each of the first base substrate 1111 and the second base substrate 1112 may be transparent glass substrate so that the incident light may be transmitted. In some examples, each of the first alignment film 1113, the second alignment film 1114, and the liquid crystal layer 1115 may also be capable of transmitting the incident light. As a result, during the manufacturing process of the one or more light-passing structures 111, each of the first base substrate 1111, the second base substrate 1112, the first alignment film 1113, the second alignment film 1114, and the liquid crystal layer 1115 may be left untreated and without through holes.

In summary, the one or more light-passing structures 111 may be formed in the non-display area (e.g., 103) of the display panel 11 as described hereinabove with reference to FIGS. 2 and 4. As such, a threshold area required to present front-facing, non-display features may be effectively eliminated.

Figure 5:
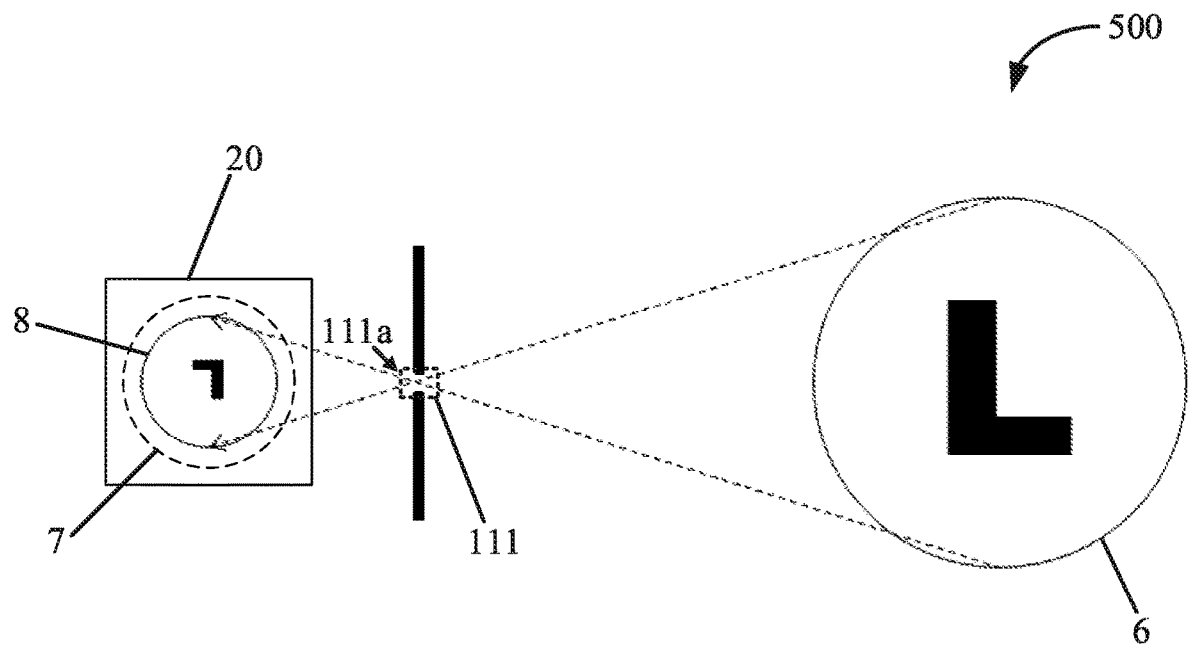
FIG. 5 shows a schematic diagram of an imaging principle for imaging by way of the light-passing structure.

Referring now to FIG. 5, a schematic diagram 500 of an imaging principle for imaging by way of any one of the one or more light-passing structures 111 is depicted. As an example, an L-shaped object 6 may be an object capable of emitting or reflecting light. The incident light emitted or reflected by the L-shaped object 6 may sequentially pass through the target polarizer (e.g., 1116), the first base substrate (e.g., 1111), the one or more through holes disposed on the black matrix 112, the first alignment film 1113, the liquid crystal layer 1115, the second alignment film 1114, and the second base substrate 1112, respectively, of the corresponding light-passing structure 111. Further, the incident light may be output from the light-emitting side 111a of the corresponding light-passing structure 111 toward the inside of the electronic device (e.g., 101). Therein, the corresponding imaging device 20 respectively disposed on the light-emitting side 111a of the corresponding light-passing structure 111 may receive the incident light output from the corresponding light-passing structure 111. In this example, an inverted L-shaped image 8 of the L-shaped object 6 may be formed by the incident light output from the corresponding light-passing structure 111.

In some examples, an area of a photosensitive region 7 of the corresponding imaging device 20 may be greater than or equal to the maximum spot size of the incident light output by the corresponding light-passing structure 111. Thus, as shown in FIG. 5, an area of the inverted L-shaped image 8 may be smaller than the area of the photosensitive region 7 of the corresponding imaging device 20.

Figure 6:
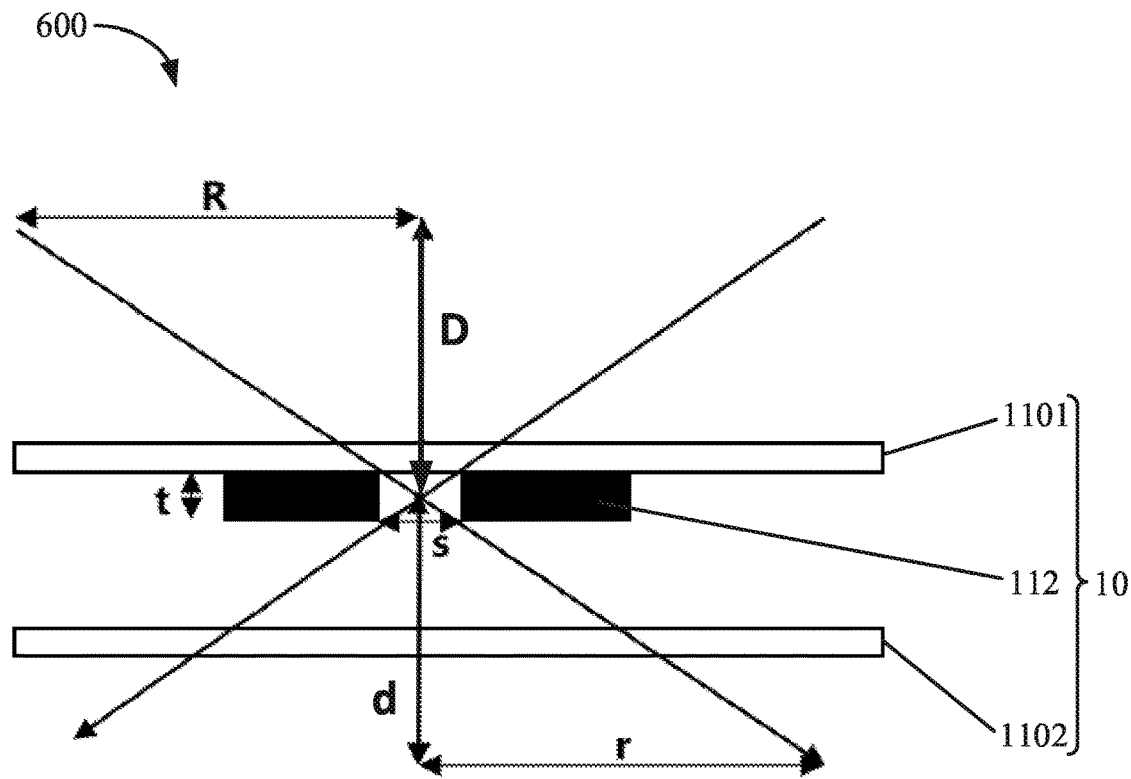
FIG. 6 shows a schematic diagram of a first example of an incident light passing through the light-passing structure.

Referring now to FIG. 6, a schematic diagram 600 of a first example of the incident light passing through any one of the one or more light-passing structures (e.g., 111) of the display device 10 is depicted. A plurality of imaging parameters are illustrated by the schematic diagram 600, including a radius R of an object, or scene (e.g., the L-shaped object 6), a distance D between an incident light intersection and the object, a thickness t of the black matrix 112, an outer diameter s of the corresponding through hole of the black matrix 112, a distance d between the incident light intersection and the photosensitive region (e.g., 7) of the corresponding imaging device (e.g., 20), and a radius r of an inverted image (e.g., the inverted L-shaped image 8) formed from the object on the photosensitive region 7 of the corresponding imaging device 20. In some examples, a thickness of the first base substrate 1111 may be small relative to D. Thus, D may approximate a distance from the object to a surface of the display panel (e.g., 11).

According to geometric similarity of triangles, each of R, D, s, t, r, and d satisfies a relationship as follows:

$$\frac{R}{D} = \frac{s}{t} = \frac{r}{d}$$

As an example, if s is 0.01 mm, t is 1.5 µm, D is 30 cm, and d is 3 mm, then the relationship may be utilized to determine that R is 200 cm and r is 20 mm.

Based on the relationship and related example described above, when the display panel (e.g., 11) is manufactured, each of the outer diameter s of the corresponding through hole of the black matrix 112 and the thickness t of the black matrix 112 may be adjusted to correspondingly adjust a size of the inverted image of the object to adapt to a size of the photosensitive region (e.g., 7) of the corresponding imaging device (e.g., 20).

It will be appreciated by those skilled in the art that FIG. 6 depicts components of a relatively simple display panel (e.g., 11) and corresponding light-passing structure (e.g., 111) to assist in explaining a transmission process of the incident light through the corresponding light-passing structure 111, in addition to the relationship between the plurality of imaging parameters. Such components as depicted by FIG. 6 do not constitute a limitation on one or more embodiments of the present disclosure.

Figure 7:
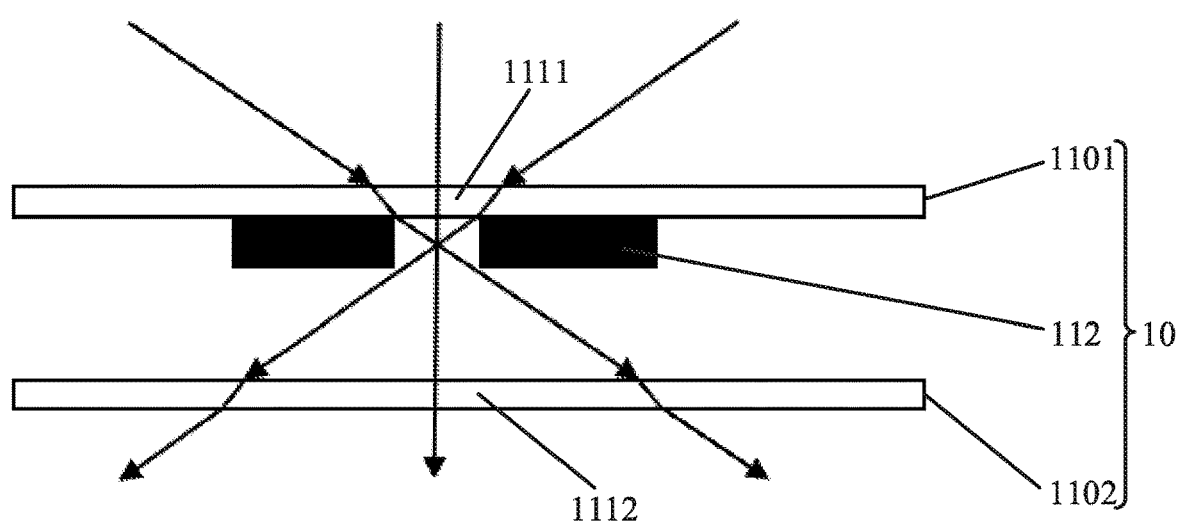
FIG. 7 shows a schematic diagram of a second example of the incident light passing through the light-passing structure.

Referring now to FIG. 7, a schematic diagram 700 of a second example of the incident light passing through any one of the one or more light-passing structures (e.g., 111) of the display device 10 is depicted. When the incident light passes through one or more transparent components, such as the first base substrate 1111 and/or the second base substrate 1112, in the corresponding light-passing structure 111, refraction is typically generated. However, since the thickness of each of the included transparent components is relatively small, the refraction of the incident light in each transparent component has little effect on each of an angle of exit and an exit path of the incident light. As such, in the description provided hereinabove with reference to FIG. 6, in order to briefly explain the transmission process of the incident light, an influence of refraction on the incident light is neglected. As will be appreciated by those skilled in the art, one or more paths of the incident light depicted by FIG. 6 do not constitute a limitation on one or more embodiments of the present disclosure.

Referring now to FIGS. 8-12, various examples of the one or more imaging devices 20 will be described in relation to the display device 10 of the electronic device (e.g., 101). Therein, a plurality of example imaging devices 20 will be respectively utilized to illustrate structural details of each example imaging device 20. It will be appreciated that, in some embodiments of the present disclosure, a plurality of imaging devices 20 will be included in the electronic device 101, while in other embodiments, a single imaging device 20 will be included in the electronic device 101. As such, specific configurations of various components of each of the display device 10 and the one or more imaging devices 20 are presented hereinbelow which illustrate placement of the one or more imaging devices 20 under the display panel 11.

Figure 8:
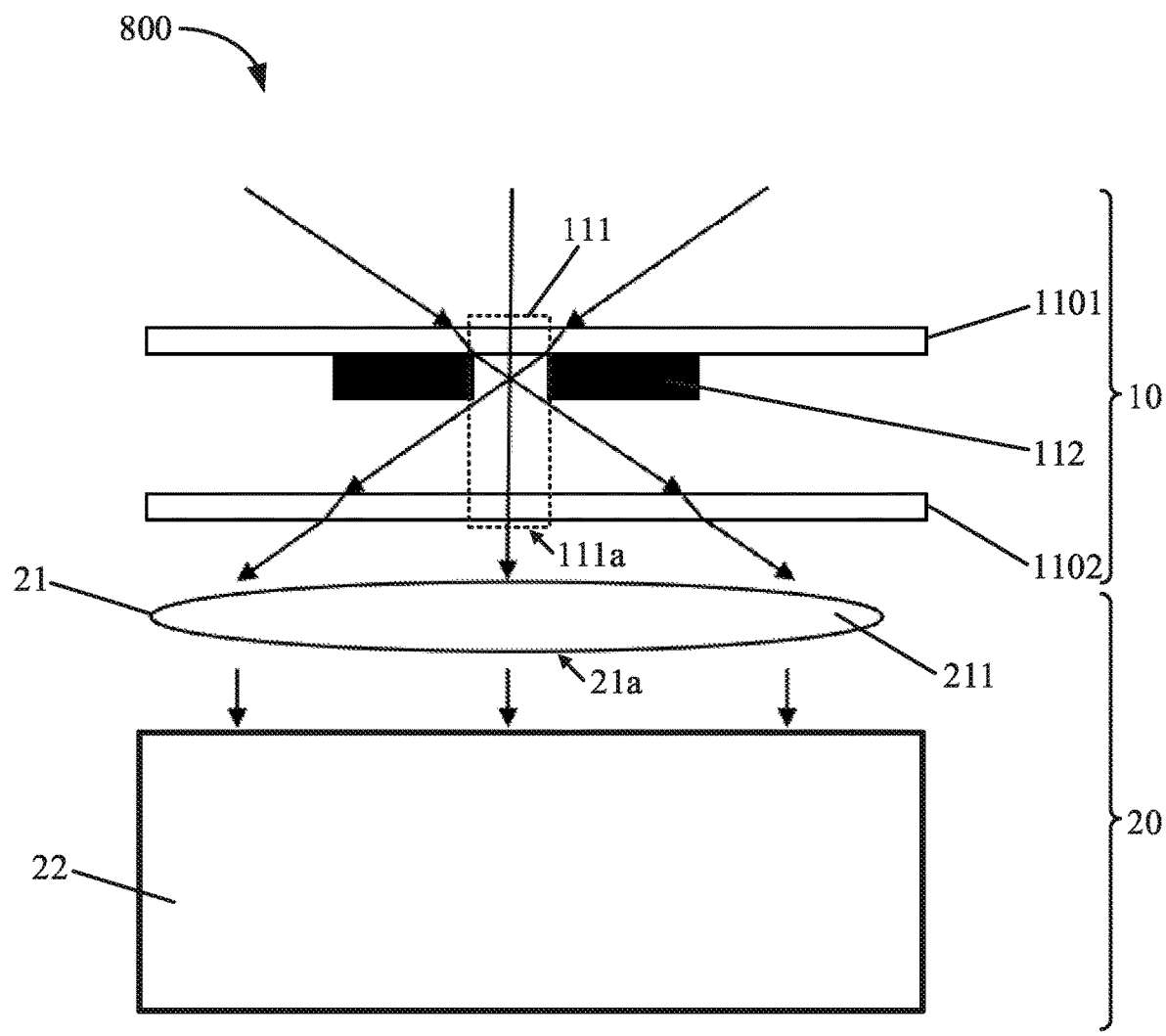
FIG. 8 shows a schematic diagram of a first example of the imaging device in relation to the display device.

Referring now to FIG. 8, a schematic diagram 800 of a first example of the imaging device 20 in relation to the display device 10 is depicted. The imaging device 20 may include a concentrating component 21 and a first photosensor 22. The concentrating component is located on the light-emitting side 111a of the corresponding light-passing structure 111, and is positioned to receive the incident light output by the corresponding light-passing structure 111, concentrate the light, and output the concentrated light to a light-emitting side 21a of the concentrating component 21. The first photosensor 22 is disposed on the light-emitting side 21a of the concentrating component 21, and is positioned to receive the concentrated light output by the concentrating component 21 in response to the imaging instruction and convert the concentrated light into one or more analog signals.

Specifically, the incident light emitted or reflected by the object (e.g., the L-shaped object 6) to be photographed may be transmitted to the light-emitting side 111a of the corresponding light-passing structure 111 by way of said light-passing structure 111, and the concentrating component 21 disposed on the light-emitting side 111a of said light-passing structure 111 may receive the incident light output by the light-passing structure 111. The concentrating component 21 may then concentrate the incident light, that is, reduce each of a degree of divergence and the spot size of the incident light. The concentrating component 21 may further output the concentrated light to the first photosensor 22.

In some examples, the concentrating component 21 may include one or more convex lenses 211. It will be appreciated that the depiction of a single convex lens 211 does not limit one or more embodiments of the present disclosure.

Figure 19:
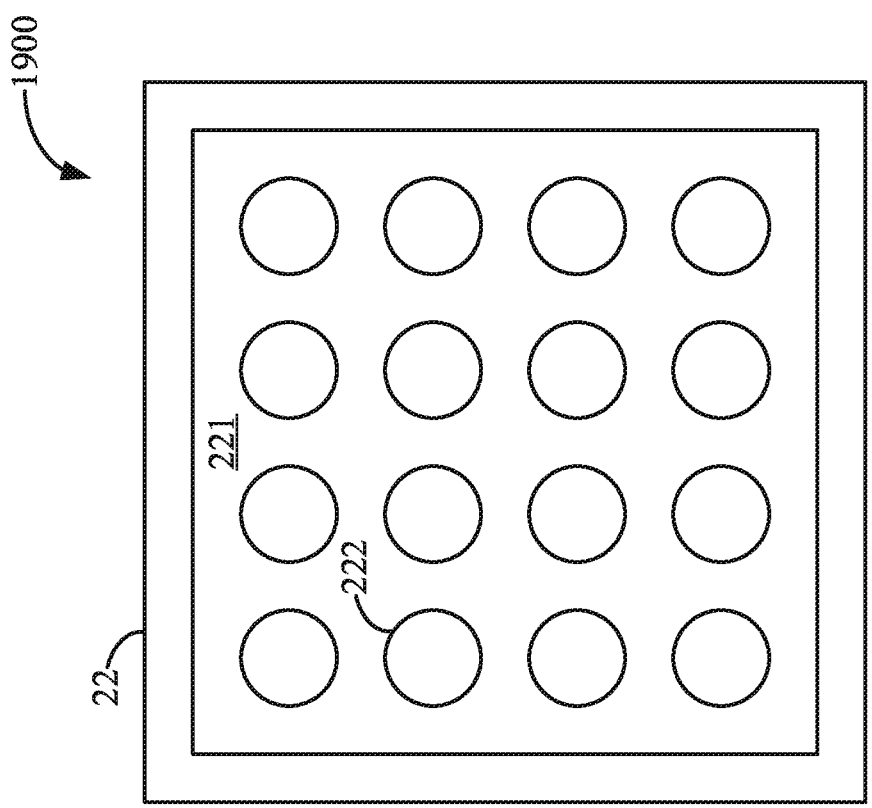
FIG. 19 shows a schematic diagram of the first photosensor of the imaging device.

Referring now to FIG. 19, a schematic diagram 1900 of the first photosensor 22 of any of the one or more imaging devices (e.g., 20) is depicted. The first photosensor 22 may receive the concentrated light output by the concentrating component (e.g., 21) in response to the imaging instruction triggered by the user. The first photosensor 22 may include a first light-receiving surface 221 and a plurality of first photosensitive sites 222 disposed on the first light-receiving surface 221. As such, light of different emitting directions may be respectively irradiated to different first photosensitive sites 222, and each of the plurality of first photosensitive sites 222 may generate charges under excitation of the corresponding light, whereby the first photosensor 22 may generate an analog signal corresponding to each of the plurality of first photosensitive sites 222 in response to the imaging instruction. That is, the concentrated light output by the concentrating component 21 may be converted to the one or more analog signals by way of the first photosensor 22 in response to the imaging instruction. In some examples, each of the plurality analog signals respectively corresponding to each of the plurality of first photosensitive sites 222 at different positions may be respectively transmitted to different pixel positions of a plurality of pixel positions of the display panel (e.g., 11). That is, the plurality of first photosensitive sites 222 may be in one-to-one correspondence with the plurality of pixel positions, so that an analog signal corresponding to a given first photosensitive site 222 may be used for display at a corresponding pixel position.

Figure 9:
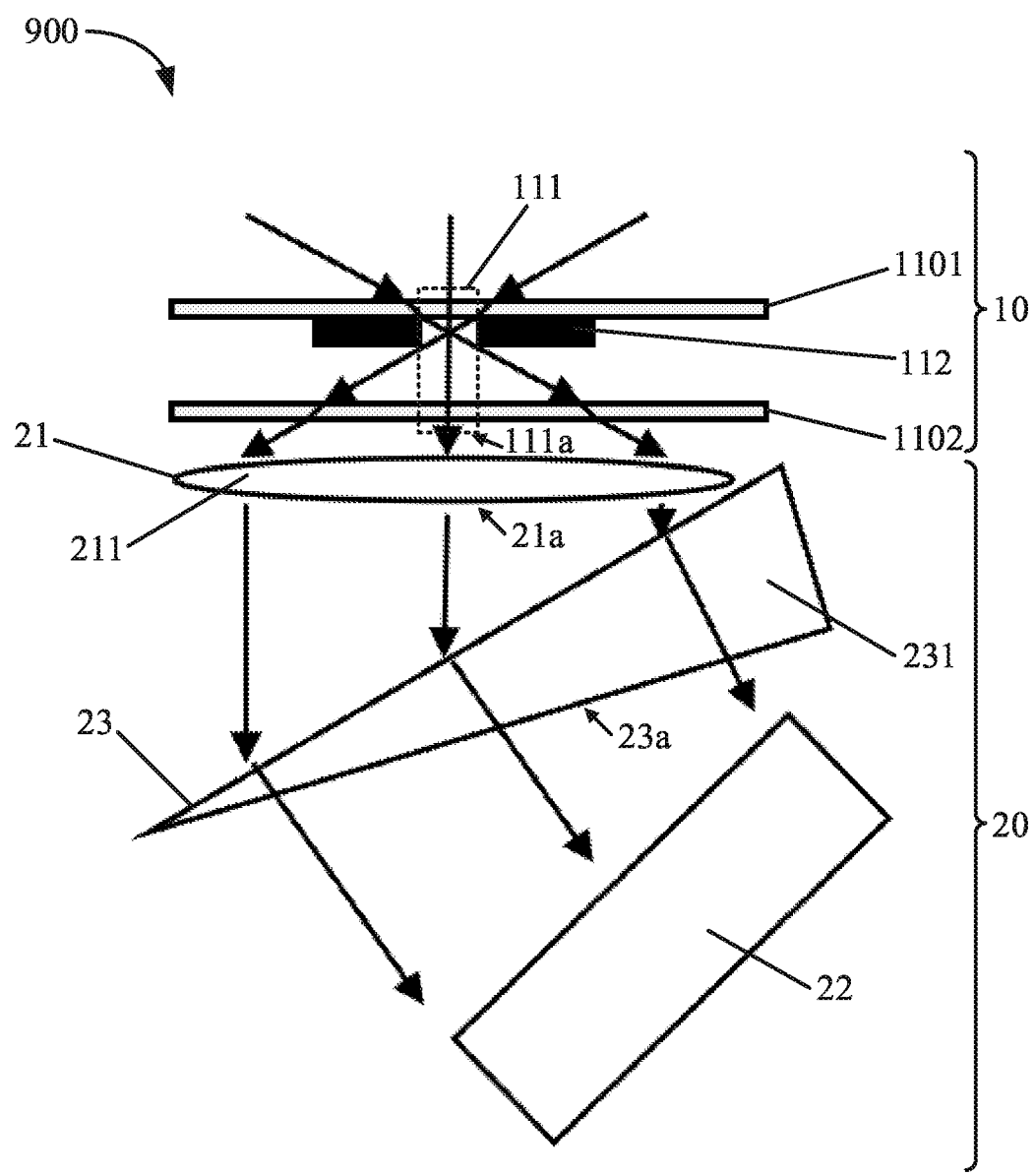
FIG. 9 shows a schematic diagram of a second example of the imaging device in relation to the display device.

Referring now to FIG. 9, a schematic diagram 900 of a second example of the imaging device 20 in relation to the display device 10 is depicted. The imaging device 20 may further include an optical path adjusting component 23, wherein the optical path adjusting component 23 may adjust an optical path of light with respect to the concentrating component 21 and the first photosensor 22. Accordingly, the optical path adjusting component 23 is disposed between the concentrating component 21 and the first photosensor 22. The optical path adjusting component is positioned to receive the concentrated light output by the concentrating component 21, perform optical path adjustment on the concentrated light, and transmit the adjusted light to the first photosensor 22. An orthographic projection of the first photosensor 22 on the display panel (e.g., 11) at least partially overlaps the display area (e.g., 102) of the display panel 11 (as described hereinbelow with reference to FIGS. 16-18).

In one example, "orthographic projection" includes a projection of three spatial dimensions into two spatial dimensions. For example, schematic diagram 200 in FIG. 2 is an orthographic projection of a three-dimensional space defined by the axes 201, 202, and 203 to a two-dimensional space, or plane, defined by the axes 201 and 202. Further, "overlap" may refer to one element partially or completely obscuring another in an orthographic projection.

Figure 18:
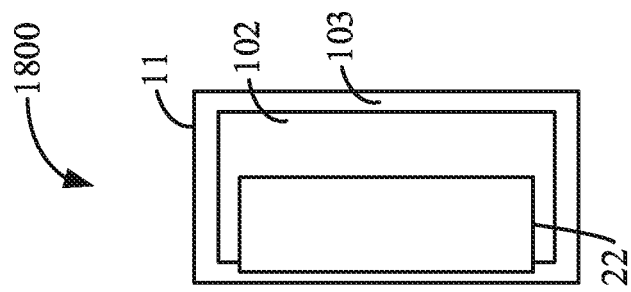
FIG. 18 shows a top view of a second example of the display panel and the first photosensor from FIG. 16.
Figure 17:
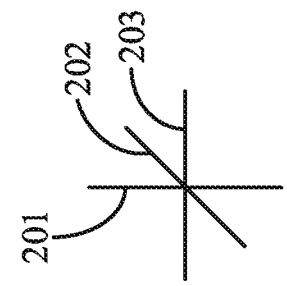
FIG. 17 shows a top view of a first example of the display panel and the first photosensor from FIG. 16.
Figure 17:
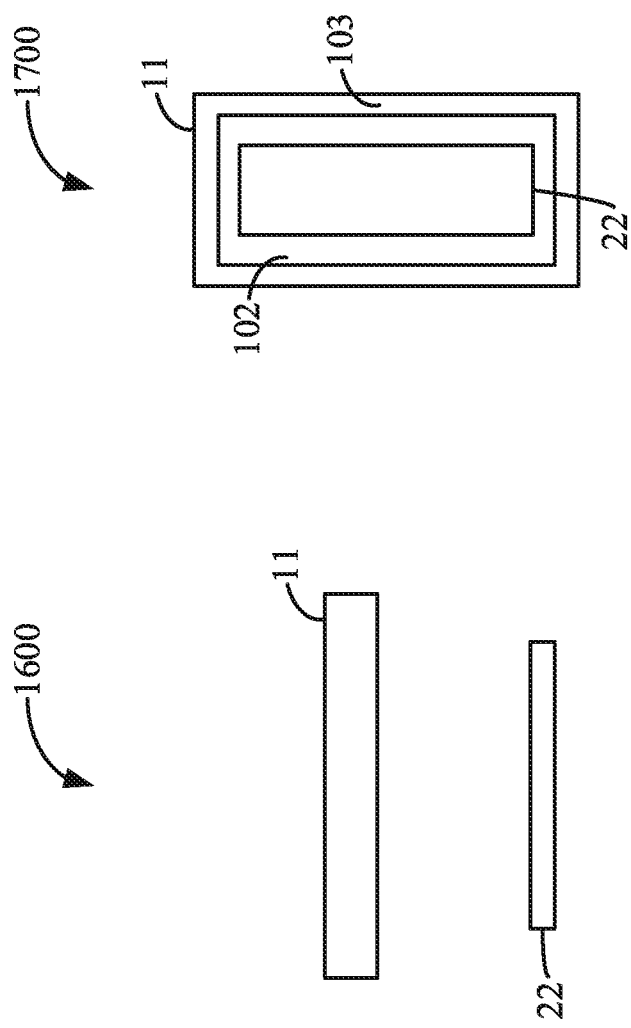
Figure 16:
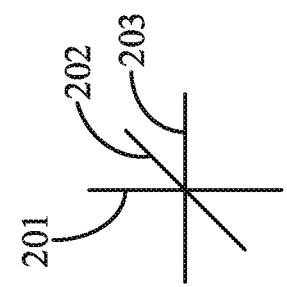
FIG. 16 shows a side view of a display panel of the display device and a first photosensor of the imaging device.

To provide examples, FIGS. 16-18 depict views of the display panel 11 and the first photosensor 22. FIG. 16 depicts a side view 1600 of the display panel 11 and the first photosensor 22. A plane of the side view 1600 may be defined by the axes 201 and 202. The axis 203 is orthogonal to the plane of the side view 1600. FIG. 17 depicts a top view 1700 of a first example of the display panel 11 and the first photosensor 22 as depicted in FIG. 16. A plane of the top view 1700 may be defined by the axes 201 and 203. The axis 202 is orthogonal to the plane of the top view 1700. In the first example of FIG. 17, the orthographic projection of the first photosensor 22 on the display panel 11 overlaps the display area 102 of the display panel 11 such that no portion of said orthographic projection is outside of the display area 102. FIG. 18 depicts a top view 1800 of a second example of the first photosensor 22 and the display panel 11 as depicted in FIG. 16. A plane of the top view 1800 may be defined by the axes 201 and 203. The axis 202 is orthogonal to the plane of the top view 1800. In the second example of FIG. 18, a portion of the orthographic projection of the first photosensor 22 on the display panel 11 partially overlaps the display area 102 of the display panel 11. A remaining portion of the orthographic projection of the first photosensor 22 on the display panel 11 partially overlaps the non-display area 103 of the display panel 11.

Referring now to FIG. 9, the incident light emitted or reflected by the object (e.g., the L-shaped object 6) to be photographed may be transmitted to the light-emitting side 111a of the corresponding light-passing structure 111 by way of said light-passing structure 111, and the concentrating component 21 disposed on the light-emitting side 111a of said light-passing structure 111 may receive the incident light output by the light-passing structure 111. The concentrating component 21 may then concentrate the incident light, that is, reduce each of a degree of divergence and the spot size of the incident light. The concentrating component 21 may further output the concentrated light to the optical path adjusting component 23.

The optical path adjusting component 23 may perform optical path adjustment on the concentrated light output by the concentrating component 21 to change a transmission path of the concentrated light, so that the adjusted light may be transmitted to the first photosensor 22. Therein, the first photosensor 22 may receive the adjusted light output by the optical path adjusting component 23 in response to the imaging instruction triggered by the user. Further, the first photosensor 22 may convert the adjusted light into the one or more analog signals in response to the imaging instruction.

In some examples, the first photosensor 22 may be disposed at a position relatively close to a center of the display area (e.g., 102) of the display panel (e.g., 11). As such, the imaging device 20 is disposed under a threshold space of the non-display area (e.g., 103) of the display panel 11. Correspondingly, a curvature of an edge of a back cover of the electronic device (e.g., 101) may be contracted toward the inside of the electronic device 101, that is, made less convex. Thus, the electronic device 101 may be manufactured to be thinner. Alternatively, an amount of space saved by one or more embodiments of the present disclosure may be employed in another manner.

Referring now to FIGS. 8, 9, and 19, for the first and second examples of the imaging device 20, the concentrating component 21 may be positioned to receive the incident light output by the corresponding light-passing structure 111, concentrate the incident light into a parallel light beam, and output the parallel light beam to the light-emitting side 21a of the concentrating component 21. Further, areas of the plurality of first photosensitive sites 222 may be equivalent to one another. Specifically, since the parallel light beam may be perpendicular, or may be adjusted to be so, to the first light-receiving surface 221 of the first photosensor 22, each of the plurality of first photosensitive sites 222 on the first light-receiving surface 221 may be set to an equivalent area, so that a complexity of manufacturing the first photosensor 22 may be reduced.

Referring now to FIG. 9, in some examples, the optical path adjusting component 23 may include one or more triangular prisms or one or more planar mirrors. For example, the optical path adjusting component 23 may include the triangular prism 231. Accordingly the first photosensor 22 may be obliquely disposed on a light-emitting side 23a of the optical path adjusting component 23 such that the orthographic projection of the first photosensor 22 on the display panel (e.g., 11) at least partially overlaps the display area (e.g., 102) of the display panel 11 (as described hereinabove with reference to FIGS. 16-18). When light passes through each of two interfaces of the triangular prism 231, said light is refracted, and a direction of said light is changed such that an optical path of said light may be adjusted.

Figure 10:
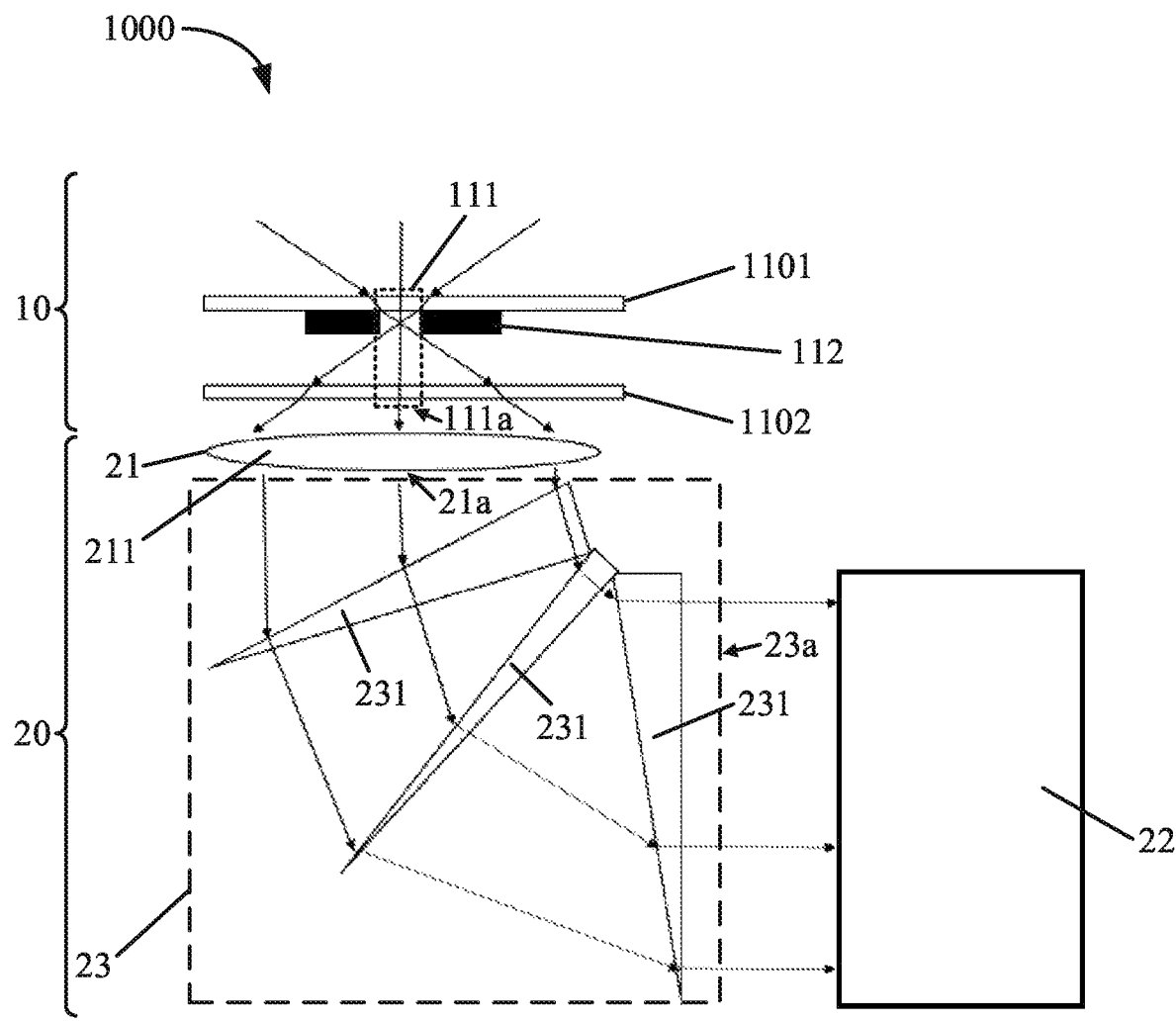
FIG. 10 shows a schematic diagram of a third example of the imaging device in relation to the display device.

Referring now to FIG. 10, a schematic diagram 1000 of a third example of the imaging device 20 in relation to the display device 10 is depicted. The optical path adjusting component 23 may include a plurality of triangular prisms, such as the three triangular prisms 231, and the light-emitting side 23a of the optical path adjusting component 23 may be below the display area (e.g., 102) of the display panel (e.g., 11). Correspondingly, the first photosensor 22 may be disposed on the light-emitting side 23a of the optical path adjusting component 23 below the display area 102 of the display panel 11. As such, the orthographic projection of the first photosensor 22 on the display panel 11 may overlap the display area 102 of the display panel 11 such that no portion of said orthographic projection is outside of the display area 102 (as described hereinabove with reference to FIGS. 16 and 17). That is, the orthographic projection of the first photosensor 22 on the display panel 11 is located entirely within the display area 102 of the display panel 11. Further, the first light-receiving surface (e.g., 221) of the first photosensor 22 may be both parallel to the light-emitting side 23a of the optical path adjusting component 23 and perpendicular to the display panel 11.

Figure 11:
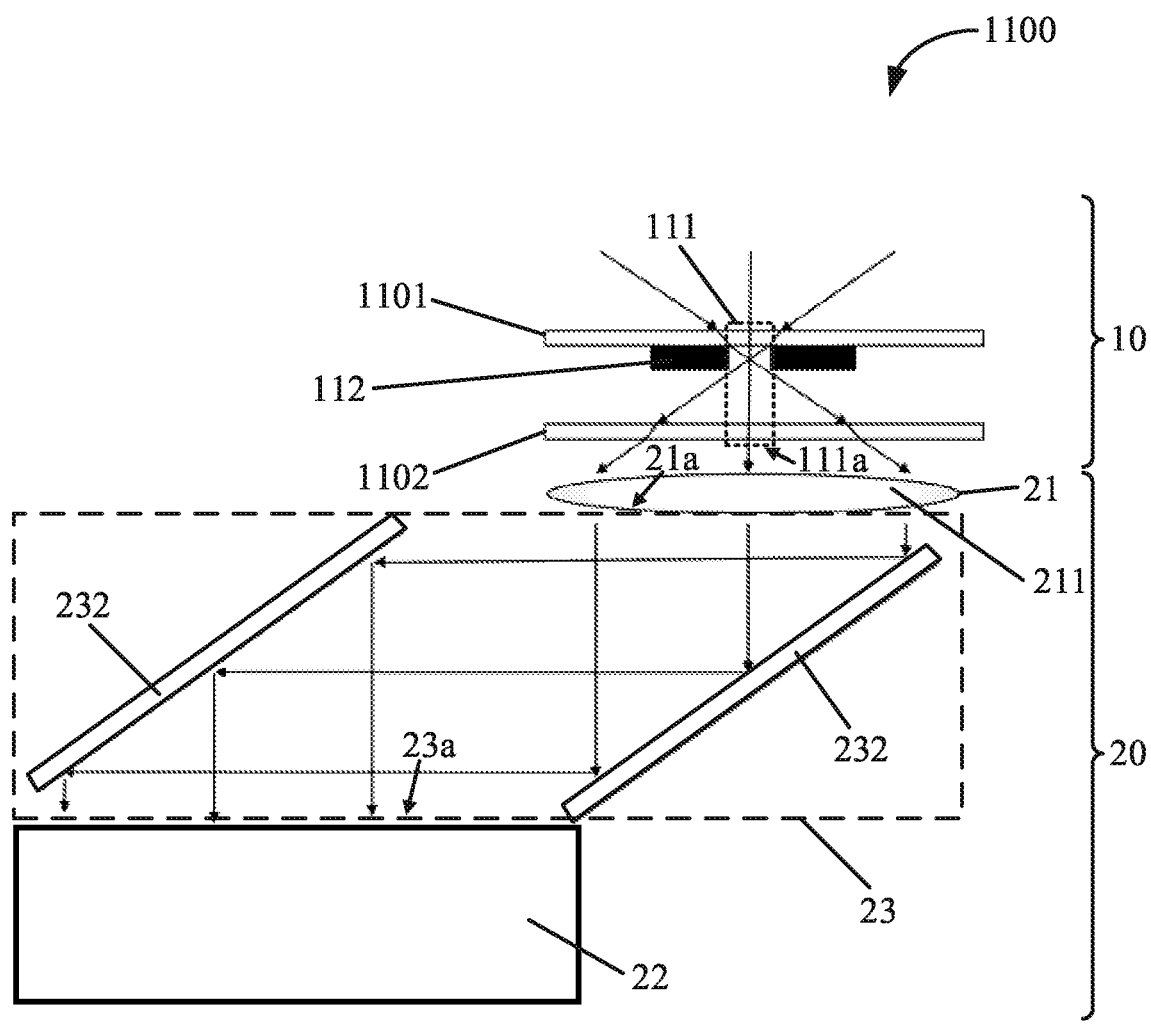
FIG. 11 shows a schematic diagram of a fourth example of the imaging device in relation to the display device.

Referring now to FIG. 11, a schematic diagram 1100 of a fourth example of the imaging device 20 in relation to the display device 10 is depicted. The optical path adjusting component 23 may include a plurality of planar mirrors, such as the two planar mirrors 232 disposed in parallel with one another. Further, reflective surfaces of each of the two planar mirrors 232 may face one another. When the reflective surface of one of the two planar mirrors 232 receives the concentrated light output by the concentrating component 21, the concentrated light may be reflected to the reflective surface of the other one or the two planar mirrors 212, whereby the transmission path of the concentrated light, having been adjusted by the two planar mirrors 232 of the optical path adjusting component 23, may be reflected to the first light-receiving surface (e.g., 221) of the first photosensor 22.

Figure 12:
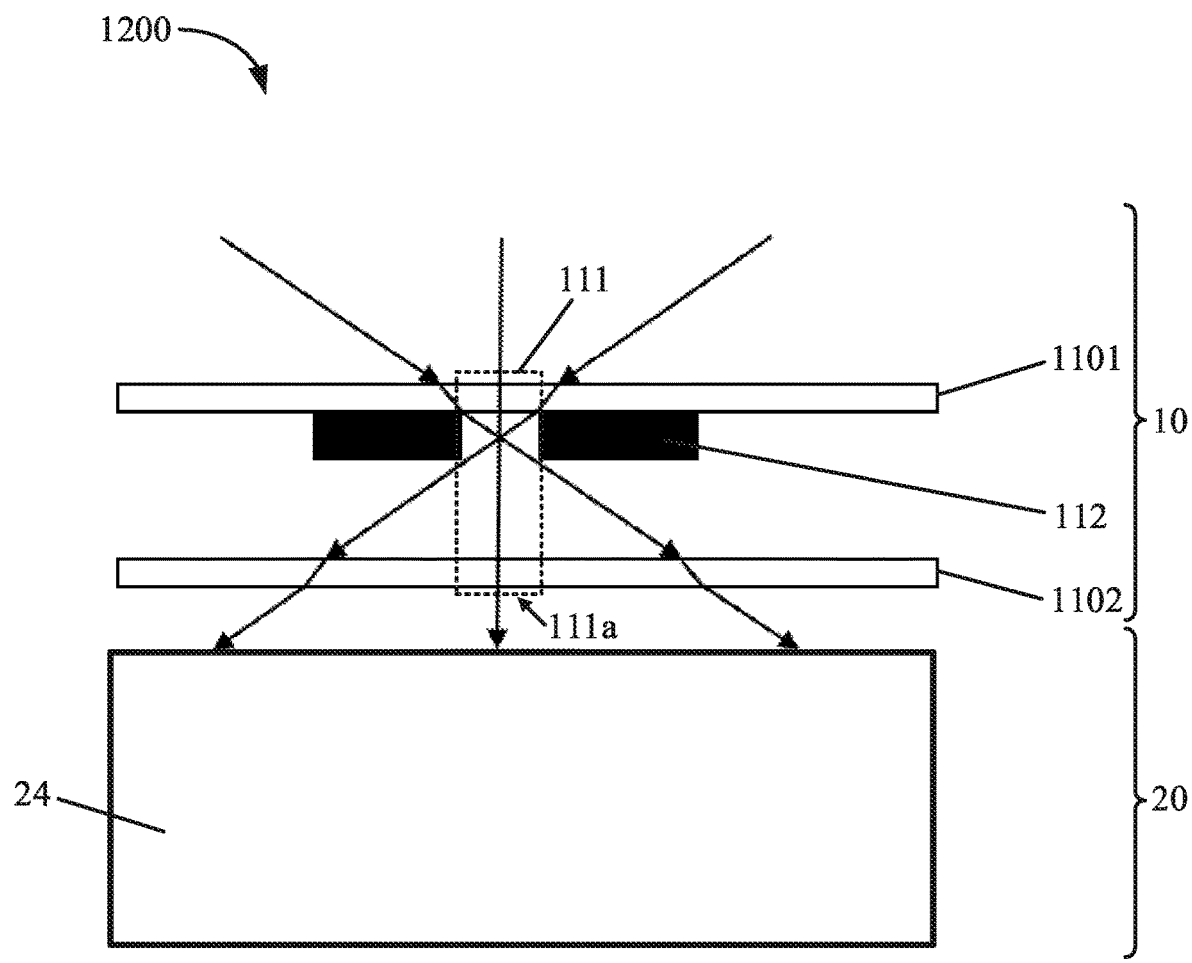
FIG. 12 shows a schematic diagram of a fifth example of the imaging device in relation to the display device.

Referring now to FIG. 12, a schematic diagram 1200 of a fifth example of the imaging device 20 in relation to the display device 10 is depicted. The imaging device 20 may only include the second photosensor 24. The second photosensor 24 is disposed on the light-emitting side 111a of the corresponding light-passing structure 111, and is positioned to receive the incident light from the corresponding light-passing structure 111 and convert the incident light into one or more analog signals in response to the imaging instruction triggered by the user. Working principles of the second photosensor 24 are substantially similar or equivalent to those of the first photosensor 22 as described hereinabove, and details of such are not described herein again.

In some examples, the first photosensor 22 may be a charge-coupled device (CCD) or a complementary metal-oxide-semiconductor (CMOS) device. Similarly, the second photosensor 24 may be a CCD or a CMOS device. It will be understood that the first photosensor 22 and/or the second photosensor 24 of one or more embodiments of the present disclosure are not limited to such types of devices.

Figure 20:
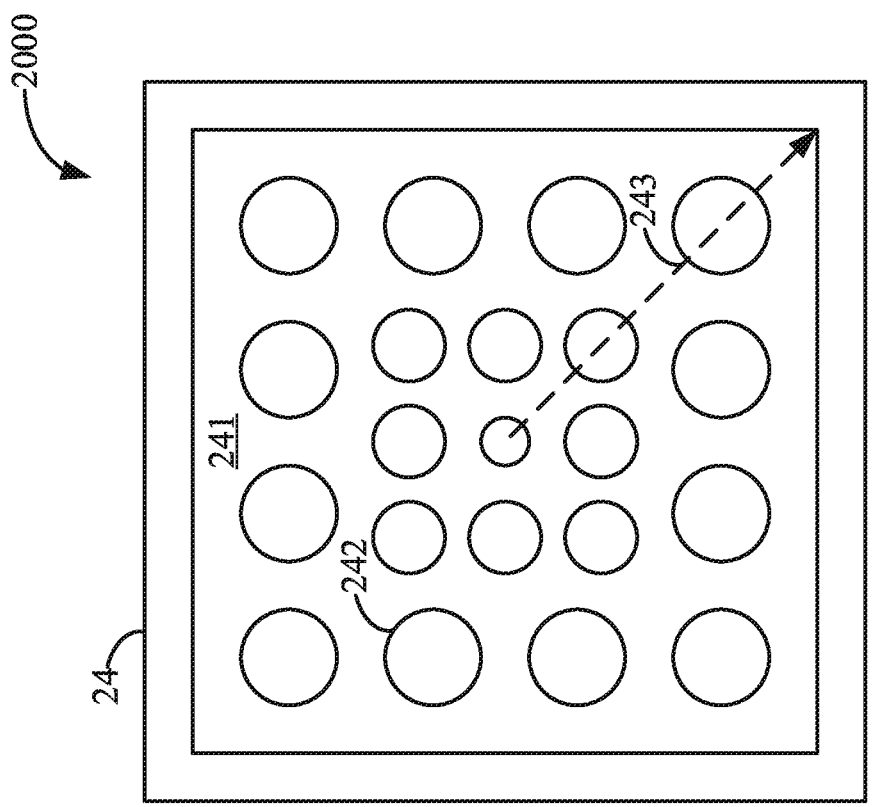
FIG. 20 shows a schematic diagram of a second photosensor of the imaging device.

Referring now to FIG. 20, a schematic diagram 2000 of the second photosensor 24 of any of the one or more imaging devices (e.g., 20) is depicted. The second photosensor 24 includes a second light-receiving surface 241 and a plurality of second photosensitive sites 242 disposed on the second light-receiving surface 241. When the incident light is received by the second light-receiving surface 241 of the second photosensor 24, the closer the incident light is to an edge of the second light-receiving surface 241, the higher the incident light diverges. Accordingly, areas of the plurality of second photosensitive sites 242 gradually increase in a direction 243 from a center of the second light-receiving surface 241 to the edge of the second light-receiving surface 241. Thereby, each of the plurality of second photosensitive sites 242 at the edge of the second light-receiving surface 241 may completely receive the incident light with a higher degree of divergence.

Referring now to FIG. 2, the display device 10 may further include a backlight module 12. The backlight module 12 is provided with a light-blocking plate 121 near a side end 111b of each of the one or more light-passing structures 111. The backlight module 12 may further include a light guide plate 122, a light bar 123 disposed at a side end 122a of the light guide plate 122, and an optical film layer 124 disposed on a side 122b of the light guide plate 122 facing the display panel 11. Since light emitted by the backlight module 12 may be reflected and refracted multiple times, a small amount of said light may leak to the one or more imaging devices 20, thereby affecting the incident light transmitted in the one or more imaging devices 20, and ultimately affecting a quality of the image produced. Therefore, the light-blocking plate 121 is disposed on a side end 12a of the backlight module 12 adjacent to each of the one or more light-passing structures 111. In this way, the light-blocking plate 121 reduces a risk of light leakage of the backlight module 12 to the one or more light-passing structures 111, thereby preventing said light from affecting the quality of the image produced.

In some examples, the one or more light-passing structures 111 may be disposed on the display panel 11 away from the non-display area (e.g., 103) on a side end 123a of the light bar 123. Accordingly, the light-blocking plate 121 may be disposed at a side end 12b of the backlight module 12 between the light bar 123 and the one or more light-passing structures 111, so that the light bar 123 may be prevented from affecting the incident light transmitted in the one or more imaging devices 20 to the greatest extent.

In some examples, if the one or more imaging devices 20 is a plurality of imaging devices 20, and specific imaging functions of the plurality of imaging devices 20 are different, a specific configuration of the plurality of imaging devices 20 in the electronic device 101 and further specific modules included therein will also be different. To that end, three example configurations of the electronic device 101 will be specifically described hereinbelow with reference to FIGS. 13, 14, and 21-23, wherein each of the three example configurations of the electronic device 101 may be defined by the one or more imaging devices 20 performing one or more specific imaging functions. It will be appreciated that various combinations and sub-combinations of these example configurations are possible without departing from the scope of this disclosure.

Further, in some example configurations of the electronic device 101, the signal processing device 30 may be electrically connected to each of the display device 10 and the one or more imaging devices 20, so that the signal processing device 30 may perform signal transmission with each of the display device 10 and the one or more imaging devices 20 by way of a wired connection. In some examples configurations, the signal processing device 30 may be wirelessly connected to each of the display device 10 and the one or more imaging devices 20, so that the signal processing device may perform signal transmission with each of the display device 10 and the one or more imaging devices 20 wirelessly. In some examples, each module in the signal processing device 30 may be electrically connected to one another, so that signals may transmitted by way of a wired connection between said modules. In some examples, each module in the signal processing device 30 may be wirelessly connected, so that signals may be transmitted wirelessly between said modules. The embodiments of the present disclosure do not specifically limit a connection manner between any two devices and/or a corresponding signal transmission mode between said two devices.

Figure 21:
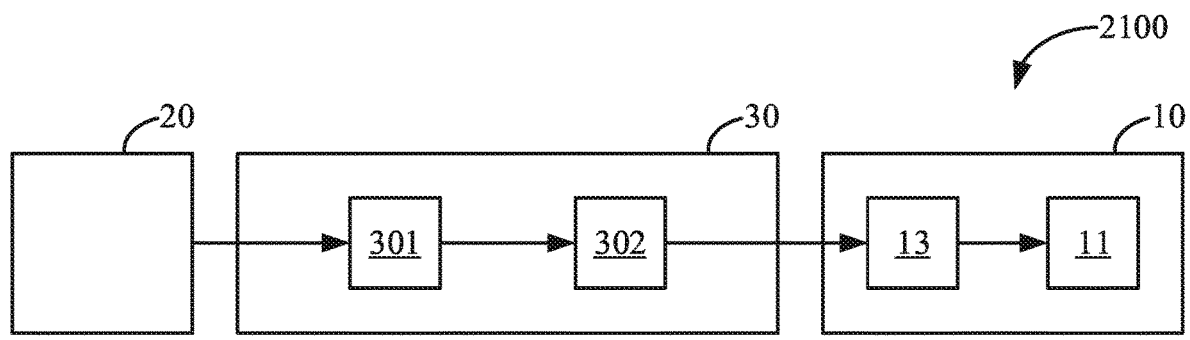
FIG. 21 shows a schematic diagram of connections between various components of a first example configuration of the electronic device.

Referring now to FIG. 21, a schematic diagram 2100 of connections between at various components of a first example configuration of the electronic device (e.g., 101) is depicted. The first example configuration of the electronic device 101 may include the one or more imaging devices 20, where the one or more imaging devices 20 may be a single imaging device 20. The imaging device 20 may be positioned to receive a plurality of light components of different colors in the incident light output by the corresponding light emitting structure (e.g., 111), and convert the plurality of light components into a corresponding plurality of analog signals, or second analog signals, in response to the imaging instruction. That is, the imaging device 20 may receive each of a plurality of light components for all colors required for display, for example, each of a plurality of light components of red, green, and blue.

The display device 10 may further include a control panel chip 13 connected to the display panel 11. In some examples, the control panel chip 13 may be a microcomputer, including a microprocessor unit, various input/output ports, an electronic storage medium for executable programs and/or instructions, such as a non-transitory read only memory chip, and random access memory.

The signal processing device 30 may include a first filter amplification module 301 and a first analog-to-digital conversion module 302. The first filter amplification module 301 may be connected to the imaging device 20, and may be positioned to receive the plurality of analog signals output by the imaging device 20, and perform filter and amplification processing on the plurality of analog signals to obtain a corresponding plurality of first intermediate signals. In some examples, the first filter amplification module 301 may be implemented in an integrated circuit architecture. The first analog-to-digital conversion module 302 may be connected to each of the first filter amplification module 301 and the control panel chip, and may be positioned to receive the plurality of first intermediate signals output by the first filter amplification module 301, convert the plurality of first intermediate signals into a corresponding plurality of display signals, or second display signals, where each of the plurality of display signals is in the form of a digital signal, and transmit the plurality of display signals to the control panel chip 13. In some examples, the first analog-to-digital conversion module 302 may be implemented in an integrated circuit architecture. The control panel chip 13 may input the plurality of display signals to the display panel 11 to cause the display panel 11 to display one or more images.

Specifically, the first filter amplification module 301 may receive the plurality of analog signals, corresponding to each of a plurality of photosensitive sites (e.g., 222, 242), output by the imaging device 20. Each of the plurality of analog signals may then be filtered, and then each of the plurality of filtered analog signals may be amplified to obtain a corresponding one of the plurality of first intermediate signals, which may be output, or transmitted, to the first analog-to-digital conversion module 302. After receiving the plurality of first intermediate signals, the first analog-to-digital conversion module 302 may perform analog-to-digital conversion on each of the plurality of first intermediate signals, thereby converting each of the plurality of first intermediate signals into the corresponding one of the plurality of display signals, where each of the plurality of display signals is in the form of a digital signal. Each of the plurality of display signals may then be output, or transmitted, to the control panel chip 13. The control panel chip 13 may then input, or transmit, the display signal to the display panel 11, and the display panel 11 may display the one or more images.

Since each of the plurality of display signals is obtain from a corresponding one of the plurality of analog signals, each of the plurality of display signals is also in one-to-one correspondence with a respective photosensitive site (e.g., 222, 242). Correspondingly, each of the plurality of display signals is also in one-to-one correspondence with a respective one of the plurality of pixel positions in the display area (e.g., 102) of the display panel 11, and the control panel chip 13 may transmit each of the plurality of display signals to a data line of the respective pixel position, so that each of the plurality of pixel positions may display pixels according to the corresponding display signal. As such, all of the display area 102 may display a corresponding image, that is, an imaging function may be realized.

Figure 22:
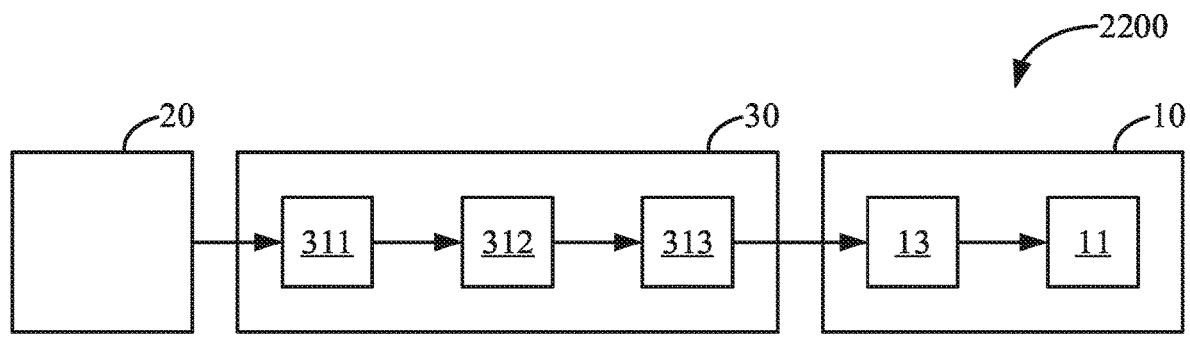
FIG. 22 shows a schematic diagram of connections between various components of a second example configuration of the electronic device.

Referring now to FIG. 22, a schematic diagram 2200 of connections between various components of a second example configuration of the electronic device (e.g., 101) is depicted. The second example configuration of the electronic device 101 may include the one or more imaging devices 20, wherein the one or more imaging devices 20 may be a plurality of imaging devices 20. The display area (e.g., 102) of the display panel 11 may be divided into a plurality of display sub-regions, and each of a plurality of images acquired by different imaging devices 20 of the plurality of imaging devices 20 respectively correspond to different display sub-regions. That is, when one of the plurality of images acquired by one of the plurality of imaging devices 20 is display separately, said image may be displayed in the corresponding display sub-region. An area of each of the plurality of display sub-regions does not overlap with an area of any other display sub-region. That is, each of the plurality of display sub-regions may be connected to an adjacent one of the plurality of display sub-regions, but may not overlap, or may have a small overlaps with said adjacent display sub-region.

Similar to the imaging device 20 of the first example configuration of the electronic device 101 described hereinabove, each of the plurality of imaging devices 20 of the second example configuration of the electronic device 101 may be positioned to receive the plurality of light components of different colors in the incident light output by the corresponding light-passing structure (e.g., 111), and convert the plurality of light components into a corresponding plurality of analog signals, or third analog signals, in response to the imaging instruction.

The display device 10 may further include the control panel chip 13 connected to the display panel 11. In some examples, the control panel chip 13 may be a microcomputer, including a microprocessor unit, various input/output ports, an electronic storage medium for executable programs and/or instructions, such as a non-transitory read only memory chip, and random access memory.

The signal processing device 30 may include a second filter amplification module 311, a second analog-to-digital conversion module 312, and an image-splicing module 313. The second filter amplification module 311 may be connected to each of the plurality of imaging devices 20, and may be positioned to receive the plurality of analog signals output by each of the plurality of imaging devices 20, and perform filter and amplification processing on the plurality of analog signals to obtain a corresponding plurality of second intermediate signals. In some examples, the second filter amplification module 311 may be implemented in an integrated circuit architecture. The second analog-to-digital conversion module 312 may be connected to the second filter amplification module 311, and may be positioned to receive each plurality of second intermediate signals respectively corresponding to each of the plurality of imaging devices 20 output by the second filter amplification module 311, and convert the received plurality of second intermediate signals into a corresponding plurality of third intermediate signals, where each of the plurality of third intermediate signals is a digital signal. In some examples, the second analog-to-digital conversion module 312 may be implemented in an integrated circuit architecture. The image-splicing module 313 may be connected to each of the second analog-to-digital conversion module 312 and the control panel chip 13, and generate, for each plurality of third intermediate signals respectively corresponding to each of the plurality of imaging devices 20, a first image corresponding to each of the plurality of imaging devices 20, splice each first image together to obtain a panoramic image, generate the display signal, or third display signal, according to the panoramic image, and transmit the display signal to the control panel chip 13. In some examples, the image-splicing module 313 may be implemented in an integrated circuit architecture. The control panel chip 13 may input the display signal to the display panel 11 to cause the display panel 11 to display the panoramic image.

Specifically, the second filter amplification module 311 may receive the plurality of analog signals, corresponding to each of the plurality of photosensitive sites (e.g., 222, 242), output by each of the plurality of imaging devices 20. Each of the plurality of analog signals may then be filtered, and then each of the plurality of filtered analog signals may be amplified to obtain a corresponding one of the plurality of second intermediate signals, which may be output, or transmitted, to the second analog-to-digital conversion module 312. After receiving the plurality of second intermediate signals, the second analog-to-digital conversion module 312 may perform analog-to-digital conversion on each of the plurality of second intermediate signals, thereby converting each of the plurality of second intermediate signals into the corresponding one of the plurality of display signals, where each of the plurality of display signals is in the form of a digital signal. Each of the plurality of display signals may then be output, or transmitted, to the image-splicing module 313.

In some examples, the plurality of light-passing structures (e.g., 111) corresponding to the plurality of imaging devices 20 may be respectively disposed at different positions of the display panel 11, and the respective positions may be relatively dispersed, as described hereinbelow with reference to FIG. 13.

Figure 13:
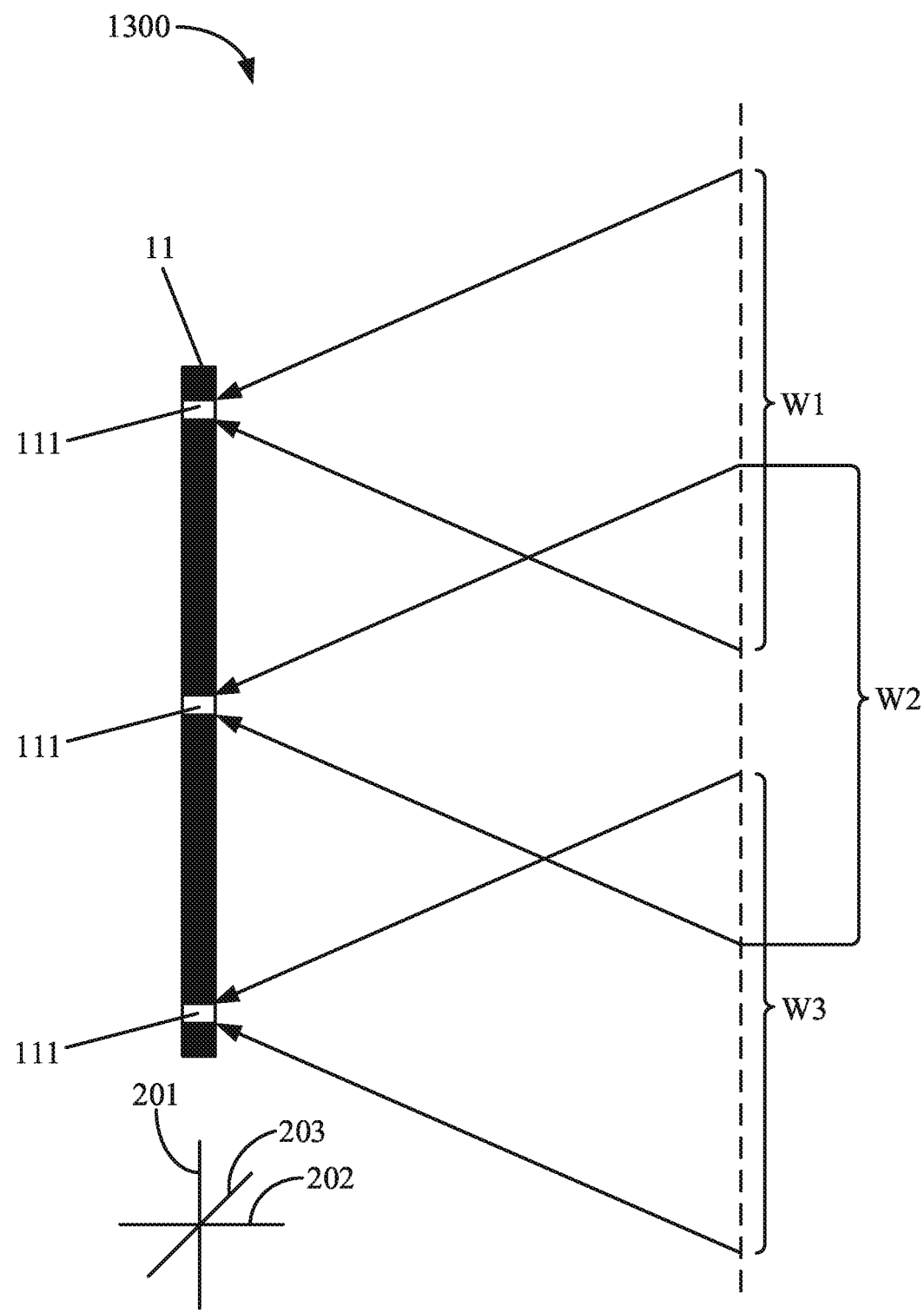
FIG. 13 shows a schematic diagram of a first example of a field of view of three light-passing structures.

Referring now to FIG. 13, a schematic diagram 1300 of a first example of a field of view of three light-passing structures 111 is depicted. The three light-passing structures 111 may be respectively disposed at upper, middle, and lower positions of the non-display area (e.g., 103) on a same side of the display panel 11, and may be arranged in a straight line. Since the respective positions of each of the three light-passing structures 111 are different, a field of view corresponding to each of the three light-passing structures 111 is also different. As an example, the light-passing structure 111 corresponding to the upper position may have a field of view W1, the light-passing structure 111 corresponding to the middle position may have a field of view W2, and the light-passing structure 111 corresponding to the lower position may have a field of view W3. In each of the field of view W1, the field of view W2, and the field of view W3, there may be content not covered by the other fields of view.

Referring now to FIG. 22, in the second example configuration of the electronic device (e.g., 101), the image-splicing module 313 may generate the first image corresponding to each of the plurality of imaging devices 20 according to each plurality of third intermediate signals corresponding to said imaging device 20. Since each of the corresponding plurality of light-passing structures (e.g., 111) has a different field of view, each first image may include content not present in other first images. Accordingly, the image-splicing module 313 may integrate repeated portions of the content in each of the first images by splicing the first images, thereby obtaining the panoramic image. Further, the image-splicing module 313 may generate the display signal corresponding to the panoramic image, and output, or transmit, the display signal to the control panel chip 13. The control panel chip 13 may then input, or transmit, the display signal corresponding to the panoramic image to the display panel 11, and the display panel 11 may display the panoramic image.

By providing the plurality of imaging devices 20 corresponding to the plurality of light-passing structures (e.g., 111) at different positions, a field of view of a captured first image may be enlarged, so that after splicing the first images having different fields of view, the panoramic image with a larger field of view may be obtained. As such, the user may obtain the panoramic image without controlling a movement of the electronic device (e.g., 101) according to a reference line, and simplifying an image-capturing process. However, when imaging a non-panoramic image, the electronic device 101 may activate only one imaging device 20 for imaging, thereby saving system resources, such as power.

Figure 23:
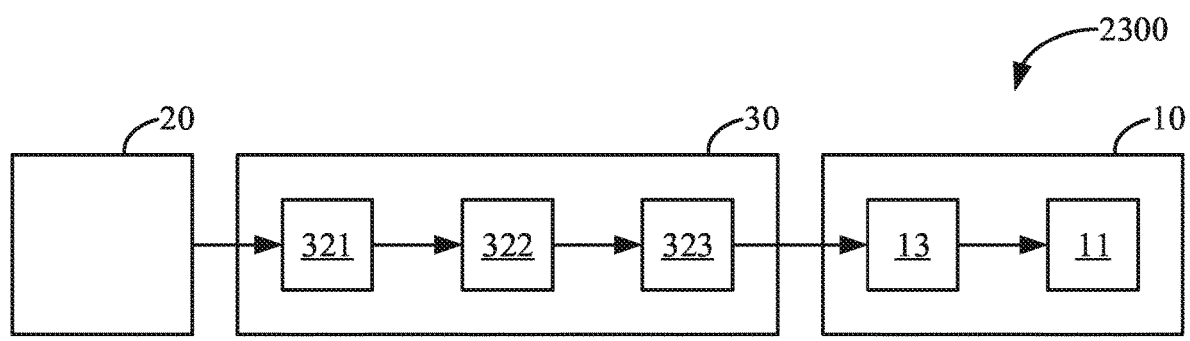
FIG. 23 shows a schematic diagram of connections between various components of a third example configuration of the electronic device.

Referring now to FIG. 23, a schematic diagram 2300 of at least some connections between various components of a third example configuration of the electronic device (e.g., 101) is depicted. The third example configuration of the electronic device 101 may include the one or more imaging devices 20, wherein the one or more imaging devices 20 may be a plurality of imaging devices 20. The display area (e.g., 102) of the display panel 11 may be divided into a plurality of display sub-regions, and each of the plurality of images acquired by the different imaging devices 20 of the plurality of imaging devices 20 respectively correspond to different display sub-regions. That is, when one of the plurality of images acquired by one of the plurality of imaging devices 20 is display separately, said image may be displayed in the corresponding display sub-region. Further, each of the plurality of display sub-regions may have an overlap region with respect to another display sub-region. Different from each of the first example configuration and the second example configuration, for the third example configuration, different imaging devices 20 of the plurality of imaging devices 20 may be respectively positioned to receive a plurality of light components of different colors in the incident light from the corresponding light-passing structure (e.g., 111). That is, each of the plurality of imaging devices 20 may only receive a plurality of light components of one of a plurality of colors in the incident light. For example, the electronic device 101 may include three imaging devices 20 that may respectively receive light components of three colors, such as red, green, and blue. In response to the imaging instruction, the plurality of light components may be converted into a corresponding plurality of analog signals, or fourth analog signals.

The display device 10 may further include the control panel chip 13 connected to the display panel 11. In some examples, the control panel chip 13 may be a microcomputer, including a microprocessor unit, various input/output ports, an electronic storage medium for executable programs and/or instructions, such as a non-transitory read only memory chip, and random access memory.

The signal processing device 30 may include a third filter amplification module 321, a third analog-to-digital conversion module 322, and an image extraction module 323. The third filter amplification module 321 may be connected to each of the plurality of imaging devices 20, and may be positioned to receive the plurality of analog signals output by each of the plurality of imaging devices 20, and perform filter and amplification processing on the plurality of analog signals to obtain a corresponding plurality of fourth intermediate signals. In some examples, the third filter amplification module 321 may be implemented in an integrated circuit architecture. The third analog-to-digital conversion module 322 may be connected to the third filter amplification module 321, and may be positioned to receive each plurality of fourth intermediate signals respectively corresponding to each of the plurality of imaging devices 20 output by the third filter amplification module 321, and convert the received plurality of fourth intermediate signals into a corresponding plurality of fifth intermediate signals, where each of the plurality of fifth intermediate signals is a digital signal. In some examples, the third analog-to-digital conversion module 322 may be implemented in an integrated circuit architecture. The image extraction module 323 may be connected to each of the third analog-to-digital conversion module 322 and the control panel chip 13, and may generate, for each plurality of fifth intermediate signals respectively corresponding to each of the plurality of imaging devices 20, a second image corresponding to each of the plurality of imaging devices 20, extract an overlapping portion of each second image to obtain a composite target image, generate a display signal, or fourth display signal, according to the composite target image, and transmit the display signal to the control panel chip 13. In some examples, the image extraction module 323 may be implemented in an integrated circuit architecture. The control panel chip 13 may input the display signal to the display panel 11 to cause the display panel 11 to display the composite target image.

Specifically, the third filter amplification module 321 may receive the plurality of analog signals, corresponding to each of the plurality of photosensitive sites (e.g., 222, 242), output by each of the plurality of imaging devices 20. Each of the plurality of analog signals may then be filtered, and then each of the plurality of filtered analog signals may be amplified to obtain a corresponding one of the plurality of fourth intermediate signals, which may be output, or transmitted, to the third analog-to-digital conversion module 322. After receiving the plurality of fourth intermediate signals, the third analog-to-digital conversion module 322 may perform analog-to-digital conversion on each of the plurality of fourth intermediate signals, thereby converting each of the plurality of fourth intermediate signals into the corresponding one of the plurality of display signals, where each of the plurality of display signals is in the form of a digital signal. Each of the plurality of display signals may then be output, or transmitted, to the image extraction module 323.

In some examples, the plurality of light-passing structures (e.g., 111) corresponding to the plurality of imaging devices 20 may be respectively disposed at different positions of the display panel 11, and the respective positions may be relatively concentrated, as described hereinbelow with reference to FIG. 14.

Figure 14:
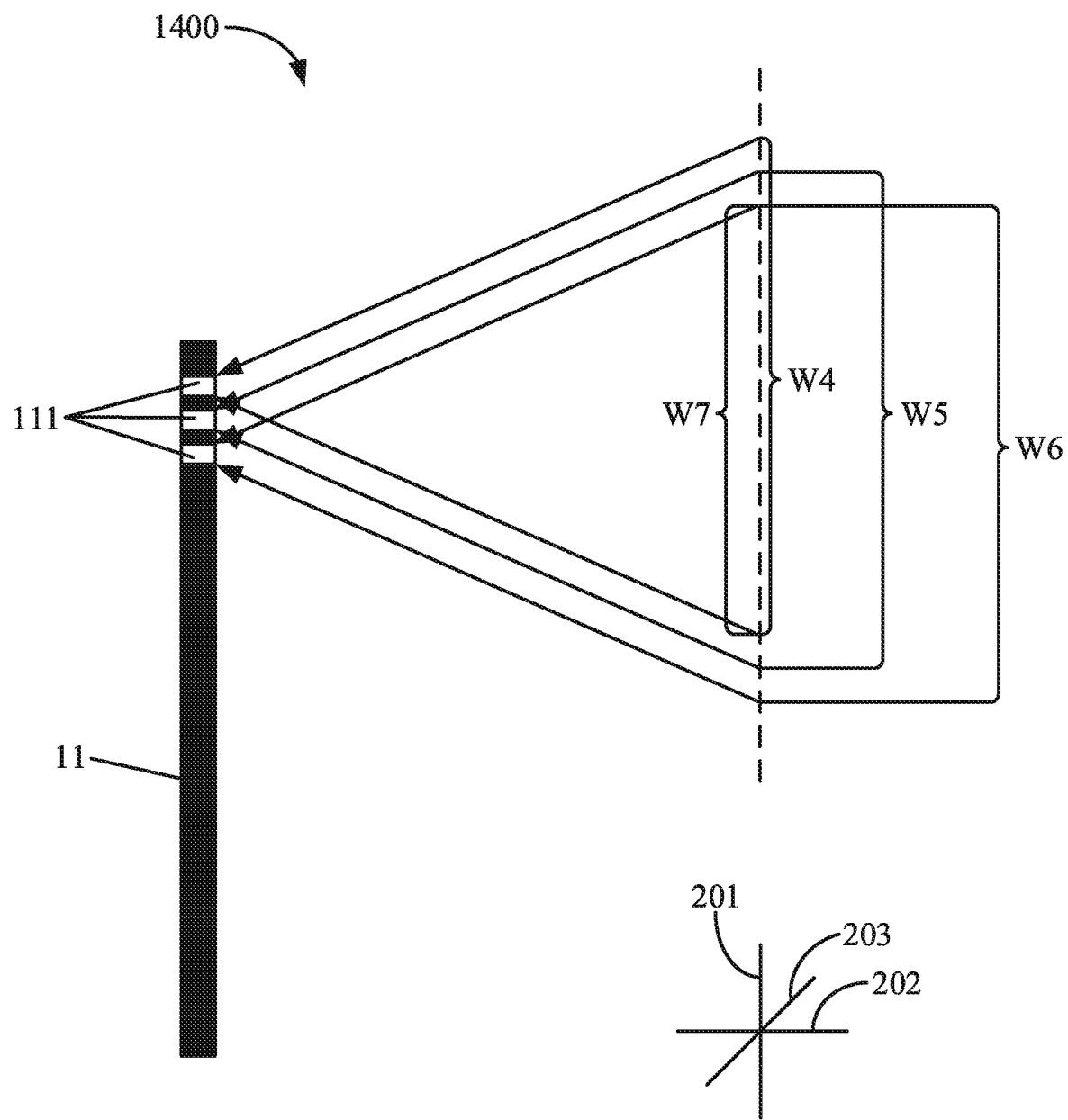
FIG. 14 shows a schematic diagram of a second example of a field of view of three light-passing structures.

Referring now to FIG. 14, a schematic diagram 1400 of a second example of the field of view of three light-passing structures 111 is depicted. The three light-passing structures 111 may be respectively disposed at upper, middle, and lower positions concentrated on an upper-left portion of the non-display area (e.g., 103) on a same side of the display panel 11 and may be arranged on a straight line. Further, each of the three light-passing structures 111 may correspond to one of three imaging devices 20, wherein one of the three imaging devices 20 may receive a red light component of the incident light by way of the corresponding light-passing structure 111, one of the three imaging devices 20 may receive a green light component of the incident light by way of the corresponding light-passing structure 111, and one of the three imaging devices 20 may receive a blue light component of the incident light by way of the corresponding light-passing structure 111. Since the respective positions of each of the three light-passing structures 111 are slightly different, a field of view corresponding to each of the three light-passing structures 111 is also slightly different. As an example, the light-passing structure 111 corresponding to the upper position may have a field of view W4, the light-passing structure 111 corresponding to the middle position may have a field of view W5, and the light-passing structure 111 corresponding to the lower position may have a field of view W6. In each of the field of view W4, the field of view W5, and the field of view W6, there may be a portion W7 which coincides with each of the other fields of view.

Referring now to FIG. 23, in the third example configuration of the electronic device (e.g., 101), the image extraction module 323 may generate the second image corresponding to each of the plurality of imaging devices 20 according to each plurality of fifth intermediate signals corresponding to said imaging device 20. Since the color of the plurality of light components respectively receivable by each of the plurality of imaging devices 20, such as the three imaging devices 20 described hereinabove with reference to FIG. 14, are different, and the fields of view of the corresponding plurality of light-passing structures (e.g., 111), such as the three light-passing structures 111 described hereinabove with reference to FIG. 14, are not completely coincident with one another, only content in an overlapping portion (e.g., portion W7) may generate a color image. Accordingly, the image extraction module 323 may extract overlapping portions of the content in each of the second images, thereby obtaining the composite target image, that is, obtaining an image portion corresponding to the field of view of the overlapping portion. Further, the image extraction module 323 may generate the display signal corresponding to the composite target image, and output, or transmit the display signal to the control panel chip 13. The control panel chip 13 may then input, or transmit, the display signal corresponding to the composite target image to the display panel 11, and the display panel 11 may display the composite target image.

A corresponding light-receiving surface (e.g., 221, 241) of each of the plurality of imaging devices 20 may be used to receive the plurality of light components of one of the plurality of colors in the incident light. Therefore, the portion of the corresponding light-receiving surface of each of the plurality of imaging devices 20 which receives the corresponding monochromatic light component may be increased, thereby both enhancing a light intensity and improving the display effect of a captured image. Further, as compared to a photosensor capable of receiving light components of each of a plurality of colors, a filter structure in a photosensor capable of receiving only the monochromatic light component may be simpler. Thus, a complexity of a manufacturing process of the photosensor (e.g., 22, 24) required for each of the plurality of imaging devices 20 may be reduced.

Referring now to FIG. 2, in some examples, the electronic device 101 may be a mobile terminal, such as a watch, a mobile phone, a smartphone, a tablet computer, or the like. In some examples, the electronic device 101 may be a non-mobile terminal, such as a television, a computer display, a picture screen, an advertisement screen, or the like.

In summary, the non-display area (e.g., 103) at the edge of the display panel 11 may have the one or more light-passing structures 111, so that the incident light may be transmitted to the inside of the electronic device 101 by way of the one or more light-passing structures 111. Each of the one or more imaging devices 20 may be respectively disposed on the light-emitting side 111a of the corresponding light-passing structure 111 toward the inside of the electronic device 101, that is, the internal space of the electronic device 101 disposed under the display panel 11. As such, the incident light output by each of the one or more light-passing structures 111 may be further transmitted to the corresponding imaging device 20 under the display panel 11 for imaging, thereby realizing the imaging function. As a result, a front imaging area may be eliminated, and the rectangular image may be displayed using a maximum portion of the user-facing side of the electronic device 101. Correspondingly, the actual screen ratio when the electronic device 101 displays the rectangular image may be increased, thereby obtaining a better visual experience and display effect.

As such, and as will be described below with reference to FIG. 15, one or more method of controlling the electronic device (e.g., 101) are provided by an embodiment of the present disclosure. It should be understood that combinations or sub-combinations of steps presented hereinbelow may be employed by one skilled in the art in controlling the electronic device 101. Further, for the sake of brevity, the steps presented hereinbelow are described in series of ordered actions. However, those skilled in the art should understand the series of ordered actions will not limit embodiments of the present disclosure, as the steps may be executed in another order, or simultaneously.

In some examples, instructions for carrying out the one or more methods of the present disclosure may be executed by a controller, such as the control panel chip (e.g., 13), based on instructions stored on a memory of the controller and in conjunction with the imaging instruction triggered by the user. As such, the described actions, operations and/or functions may graphically represent code to be programmed into non-transitory memory of the computer readable storage medium in the controller, where the described actions are carried out by executing the instructions in the electronic device (e.g., 101) including the various hardware components in combination with the controller.

Figure 15:
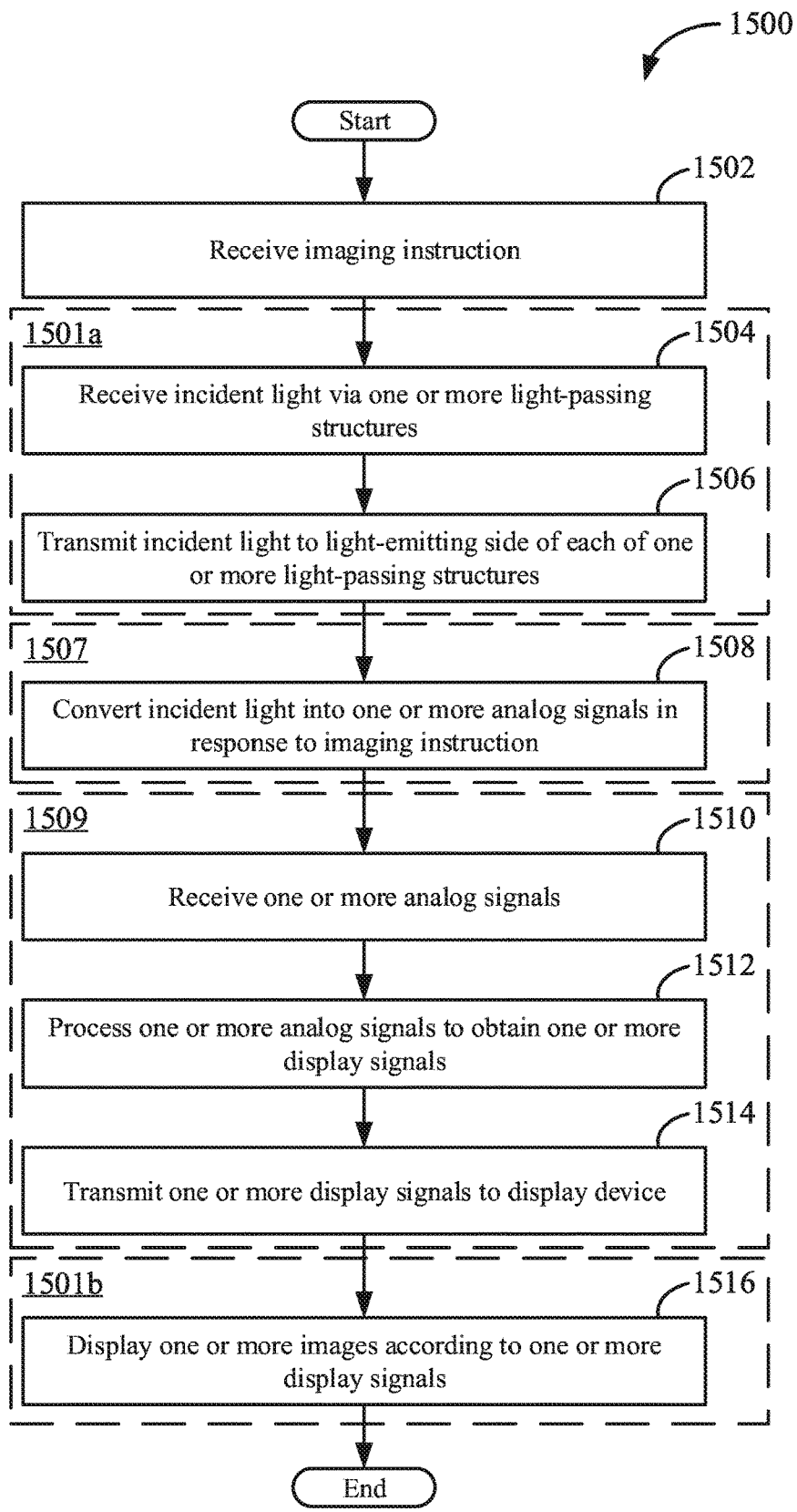
FIG. 15 shows a flow diagram of a method of controlling the electronic device according to an embodiment of the present disclosure.

Referring now to FIG. 15, a flow diagram 1500 of a method of controlling the electronic device (e.g., 101) is depicted. Boxes 1501a and 1501b indicate steps which may occur at the display device (e.g., 10). A box 1507 indicates steps which may occur at the one or more imaging, or image-capturing, or camera, devices (e.g., 20). A box 1509 indicates steps which may occur at the signal processing device (e.g., 30).

At 1502, the imaging, or image-capturing, or shooting, or photographing, instruction may be received by the electronic device (e.g., 101). In some examples, the user may trigger the imaging instruction by way of any imaging application of the electronic device 101. For example, the user may click, or tap, or touch, a virtual imaging button in an interface of the imaging application, and the electronic device 101 may receiving the imaging instruction.

At 1504, the incident light may be received by way of the one or more light-passing structures (e.g., 111) respectively corresponding to the one or more imaging devices (e.g., 20), at 1506, the incident light may be transmitted to the light-emitting side (e.g., 111a) of each of the one or more light-passing structures 111, and, at 1508, the one or more imaging devices 20 may convert the incident light into the one or more analog signals in response to the imaging instruction. In some examples, each of the first base substrate (e.g., 1111), the second base substrate (e.g., 1112), the first alignment film (e.g., 1113), the second alignment film (e.g., 1114), the liquid crystal layer (e.g., 1115), and the target polarizer (e.g., 1116) included in each of the one or more light-passing structures 111 are not controlled by a circuit of the electronic device (e.g., 101). As such, each of the one or more light-passing structures 111 may transmit the incident light to the light-emitting side 111a of said light-passing structure 111 in real time. In each of the one or more imaging devices 20, only the photosensor (e.g., the first photosensor 22, the second photosensor 24) may be an electronic control device, which may be controlled by the circuit. Therefore, after the electronic device 101 receives the imaging instruction, the photosensor in each of the one or more imaging devices 20 may be activated in response to the imaging instruction, and said photosensor may thereafter receive the incident light output by the corresponding light-passing structure 111. As such, each of the plurality of photosensitive sites (e.g., 222, 242) on the light-receiving surface (e.g., 221, 241) of the photosensor may generate charges under excitation of the incident light, thereby generating the analog signal corresponding to each photosensitive site.

In some examples, the concentrating component (e.g., 21) may be disposed between the photosensor (e.g., the first photosensor 22, the second photosensor 24) of each of the one or more imaging devices (e.g., 20) and the corresponding light-passing structure (e.g., 111). The concentrating component 21 may receive the incident light output by the corresponding light-passing structure 111, concentrate the incident light, and output the concentrated light to the photosensor. Thereafter, the photosensor may receive the concentrated light output by the concentrating component 21 in response to the imaging instruction, and convert the concentrated light into the one or more analog signals.

In some examples, the optical path adjusting component (e.g., 23) may be disposed between the concentrating component (e.g., 21) and the photosensor (e.g., the first photosensor 22, the second photosensor 24). The optical path adjusting component 23 may receive the concentrated light output by the concentrating component 21, perform optical path adjustment on the concentrated light, and transmit the adjusted light to the photosensor. Thereafter, the photosensor may receive the adjusted light in response to the imaging instruction, and convert the adjusted light into the one or more analog signals.

In some examples, each of the concentrating component (e.g., 21) and the optical path adjusting component (e.g., 23) may be composed of optical lenses instead of electronic control devices. As such, each of the concentrating component 21 and the optical path adjusting component 23 may not be controlled by the circuit. In such examples, only the photosensor (e.g., the first photosensor 22, the second photosensor 24) in each of the one or more imaging devices (e.g., 20) may operate under control of the circuit.

In some examples, after receiving the incident light output by the corresponding light-passing structure (e.g., 111), each of the one or more imaging devices (e.g., 20) may convert the incident light into the one or more analog signals in response to the imaging instruction. Specifically, the photosensor (e.g., the first photosensor 22, the second photosensor 24) in each of the one or more imaging devices 20 may receive the light output by an upper device by way of each of the plurality of photosensitive sites (e.g., 222, 242). In some examples, the upper device may be one or more of the corresponding light-passing structure 111, the concentrating component (e.g., 21), or the optical path adjusting component (e.g., 23). It will be understood that the embodiments of the present disclosure do not limit the upper device. The photosensor may convert the received light into the one or more analog signals in response to the imaging instruction, and may then output said analog signal to a further device, such as the signal processing device (e.g., 30).

At 1510, the signal processing device (e.g., 30) may receive the one or more analog signals output by the one or more imaging devices (e.g., 20). In some examples, the signal processing device 30 may be an electronic control device, and thus may be activated by the circuit. When activated, the signal processing device 30 may then receive the one or more analog signals output by each of the one or more imaging devices 20.

At 1512, the signal processing device (e.g., 30) may process the one or more analog signals to obtain the one or more display signals. In some examples, in step 1512, as well as in steps 1514 and 1516 as described hereinbelow, the one or more display signals may be a single display signal. In some examples, after receiving the one or more analog signals output by the one or more imaging devices (e.g., 20), the signal processing device 30 may separately perform filtering and amplifying processing on each of the one or more analog signals, and then may perform analog-to-digital conversion on each of the one or more filtered and amplified analog signals to obtain the one or more display signals, or one or more intermediate signals, where each of the one or more obtained signals is in the form of a digital signal. If the one or more intermediate signals are obtained after the analog-to-digital conversion, each of the one or more display signals may be obtained based on a corresponding one of the one or more intermediate signals. The one or more intermediate signals or the one or more display signals obtained after the analog-to-digital conversion may be related to a number of the one or more imaging devices 20 included in the electronic device 101, and a color of the light that may be received by each of the one or more imaging devices 20, as described in detail hereinabove.

At 1514, the signal processing device (e.g., 30) may transmit the one or more display signals. In some examples, after the signal processing device 30 generates the one or more display signals, the one or more display signals may be transmitted to the control panel chip (e.g., 13) in the display device (e.g., 10).

At 1516, the display device (e.g., 10) may display one or more images according to the one or more display signals transmitted by the signal processing device (e.g., 30). In some examples, in step 1516, the one or more images may be a single image. In some examples, after receiving the one or more display signals transmitted by the signal processing device 30, the control panel chip (e.g., 13) may input the one or more display signals to the display panel (e.g., 11). Thereafter, the display panel 11 may display the one or more images. Thus, the electronic device (e.g., 101) may realize the imaging function.

In summary, when the electronic device (e.g., 101) receives the imaging instruction, the electronic device may receive, by way of the one or more light-passing structures (e.g., 111) respectively corresponding to the one or more imaging devices (e.g., 20), an incident light. Therein, the incident light may transmitted to the light-emitting side (e.g., 111a) of each of the one or more light-passing structures 111, and converted, by way of the one or more imaging devices 20, into the one or more analog signals in response to the imaging instruction. The signal processing device (e.g., 30) may receive the one or more analog signals output by the one or more imaging devices 20, process each of the one or more analog signals to obtain the one or more display signals, and transmit the one or more display signals to the display device (e.g., 10). Thereafter, the display device 10 may display the one or more images according to the one or more display signals transmitted by the signal processing device 30.

Accordingly, the electronic device (e.g., 101) may include the non-display area (e.g., 103) at the edge of the display panel (e.g., 11), which may have the one or more light-passing structures (e.g., 111) so that the incident light may be transmitted to the inside of the electronic device 101 by way of the one or more light-passing structures 111. Each of the one or more imaging devices (e.g., 20) may be respectively disposed on the light-emitting side (e.g., 111a) of the corresponding light-passing structure 111 toward the inside of the electronic device 101, that is, the internal space of the electronic device 101 disposed under the display panel 11. As such, the incident light output by each of the one or more light-passing structures 111 may be further transmitted to the corresponding imaging device 20 under the display panel 11 for imaging, thereby realizing the imaging function. As a result, a front imaging area may be eliminated, and the rectangular image may be displayed using a maximum portion of the user-facing side of the electronic device 101. Correspondingly, the actual screen ratio when the electronic device 101 displays the rectangular image may be increased, thereby obtaining a better visual experience and display effect.

In this way, an electronic device is provided, which includes a display panel and a non-display area surrounding an edge of the display panel. The non-display area is provided with a light-passing structure so that incident light may be transmitted to an internal space of the electronic device disposed under the display panel. Further, an imaging device is disposed on a light-emitting side of the light-passing structure, that is, within the internal space of the electronic device, so that light emitted by the light-passing structure may be further transmitted to the imaging device for imaging. The imaging device may utilize the focusing of incident light in an aperture to condense a spot size of the incident light into the imaging device within the internal space of the electronic device and under the display panel. The technical effect of arranging the imaging device in this manner is that an imaging function of the imaging device may be retained while eliminating a threshold area required for placement of the imaging device on a user-oriented side of the electronic device, thereby improving the actual screen ratio of a rectangular image displayed on the user-oriented side of the electronic device.

In one example, an electronic device, comprising: a display device; one or more imaging devices; and a signal processing device; wherein the display device comprises a display panel and a non-display area at an edge of the display panel, the non-display area having one or more light-passing structures, where each of the one or more light-passing structures comprises a light-emitting side facing an internal space of the electronic device; each of the one or more imaging devices respectively corresponds to one of the one or more light-passing structures, and is disposed on the light-emitting side of the corresponding light-passing structure; and the signal processing device is connected to each of the display device and the one or more imaging devices.

Optionally, the electronic device, wherein each of the one or more light-passing structures transmits an incident light to the light-emitting side thereof; the display device displays an image according to a first display signal sent by the signal processing device; each of the one or more imaging devices is positioned to receive the incident light output by the corresponding light-passing structure, and converts the incident light into one or more first analog signals in response to an imaging instruction; and the signal processing device is positioned to receive the one or more first analog signals output by any of the one or more imaging devices, processes the one or more first analog signals to obtain the first display signal, and transmits the first display signal to the display device.

Optionally, the electronic device, wherein each of the one or more imaging devices comprises: a concentrating component disposed on the light-emitting side of the corresponding light-passing structure, wherein the concentrating component comprises a light-emitting side, is positioned to receive the incident light output by the corresponding light-passing structure, concentrates the incident light, and outputs the concentrated light to the light-emitting side thereof; and a first photosensor disposed on the light-emitting side of the concentrating component, wherein the first photosensor is positioned to receive the concentrated light output by the concentrating component, and converts the concentrated light into the one or more first analog signals in response to the imaging instruction.

Optionally, the electronic device, wherein the concentrating component is positioned to receive the incident light output by the corresponding light-passing structure, concentrates the incident light into a parallel light beam, and outputs the parallel light beam to the light-emitting side thereof; and the first photosensor comprises a first light-receiving surface provided with a plurality of first photosensitive sites, where areas of the plurality of first photosensitive sites are equivalent to one another.

Optionally, the electronic device, wherein the concentrating component comprises one or more convex lenses.

Optionally, the electronic device, wherein each of the one or more imaging devices further comprises an optical path adjusting component disposed between the concentrating component and the first photosensor, wherein the optical path adjusting component is positioned to receive the concentrated light output by the concentrating component, performs optical path adjustment on the concentrated light, and transmits the adjusted light to the first photosensor; and an orthographic projection of the first photosensor on the display panel at least partially overlaps a display area of the display panel.

Optionally, the electronic device, wherein the optical path adjusting component comprises one or more triangular prisms or one or more planar mirrors.

Optionally, the electronic device, wherein each of the one or more imaging devices comprises a second photosensor disposed on the light-emitting side of the corresponding light-passing structure, wherein the second photosensor is positioned to receive the incident light from the corresponding light-passing structure, and converts the incident light into the one or more first analog signals in response to the imaging instruction.

Optionally, the electronic device, wherein the second photosensor comprises a second light-receiving surface provided with a plurality of second photosensitive sites, where areas of the plurality of second photosensitive sites gradually increase from a center of the second light-receiving surface to an edge of the second light-receiving surface.

Optionally, the electronic device, wherein each of the one or more light-passing structures comprises: a first substrate; a second substrate; a first alignment film formed on a side of the first substrate facing the second substrate; a second alignment film formed on a side of the second substrate facing the first substrate; a liquid crystal layer disposed between the first alignment film and the second alignment film; and a target polarizer disposed on a side of the first substrate facing away from the second substrate, or on a side of the second substrate facing away from the first substrate.

Optionally, the electronic device, wherein the display panel comprises a color filter substrate, where a black matrix of the color filter substrate is provided with one or more through holes for respectively forming the one or more light-passing structures, and an outer diameter of each of the one or more through holes is greater than or equal to 10 μm and less than or equal to 20 μm.

Optionally, the electronic device, wherein the display device further comprises a backlight module provided with a light-blocking plate near a side end of each of the one or more light-passing structures.

Optionally, the electronic device, wherein the one or more imaging devices is one imaging device; the one imaging device is positioned to receive a plurality of light components of different colors in the incident light output by the corresponding light-passing structure, and converts the plurality of light components into a corresponding plurality of second analog signals in response to the imaging instruction; the display device further comprises a control panel chip connected to the display panel; and the signal processing device comprises: a first filter amplification module connected to the one imaging device, wherein the first filter amplification module is positioned to receive the plurality of second analog signals output by the one imaging device, and performs filter and amplification processing on the plurality of second analog signals to obtain a corresponding plurality of first intermediate signals; and a first analog-to-digital conversion module connected to each of the first filter amplification module and the control panel chip, wherein the first analog-to-digital conversion module is positioned to receive the plurality of first intermediate signals output by the first filter amplification module, converts the plurality of first intermediate signals into a corresponding plurality of second display signals, where each of the plurality of second display signals is a digital signal, and transmits the plurality of second display signals to the control panel chip, where the control panel chip inputs the plurality of second display signals to the display panel to cause the display panel to display one or more images.

Optionally, the electronic device, wherein the one or more imaging devices is a plurality of imaging devices; a display area of the display panel is divided into a plurality of display sub-regions; each of a plurality of images acquired by different imaging devices of the plurality of imaging devices respectively correspond to different display sub-regions; an area of each of the plurality of display sub-regions does not overlap with an area of any other display sub-region; each of the plurality of imaging devices is positioned to receive a plurality of light components of different colors in the incident light output by the corresponding light-passing structure, and converts the plurality of light components into a corresponding plurality of third analog signals in response to the imaging instruction; the display device further includes a control panel chip connected to the display panel; and the signal processing device comprises: a second filter amplification module connected to each of the plurality of imaging devices, wherein the second filter amplification module is positioned to receive the plurality of third analog signals output by each of the plurality of imaging devices, and performs filter and amplification processing on the plurality of third analog signals to obtain a corresponding plurality of second intermediate signals; a second analog-to-digital conversion module connected to the second filter amplification module, wherein the second analog-to-digital conversion module is positioned to receive each plurality of second intermediate signals output by the second filter amplification module, and converts the received plurality of second intermediate signals into a corresponding plurality of third intermediate signals, where each of the plurality of third intermediate signals is a digital signal; an image-splicing module connected to each of the second analog-to-digital conversion module and the control panel chip, wherein the image-splicing module generates, for each plurality of third intermediate signals respectively corresponding to each of the plurality of imaging devices, a first image corresponding to each of the plurality of imaging devices, splices each first image together to obtain a panoramic image, generates a third display signal according to the panoramic image, and transmits the third display signal to the control panel chip, where the control panel chip inputs the third display signal to the display panel to cause the display panel to display the panoramic image.

Optionally, the electronic device, wherein the one or more imaging devices is a plurality of imaging devices; a display area of the display panel is divided into a plurality of display sub-regions; each of a plurality of images acquired by different imaging devices of the plurality of imaging devices respectively correspond to different display sub-regions; each of the plurality of display sub-regions has an overlap region with respect to another display sub-region; each of the plurality of imaging devices is positioned to receive a plurality of light components of one of a plurality of colors in the incident light output by the corresponding light-passing structure, and converts the plurality of light components into a corresponding plurality of fourth analog signals in response to the imaging instruction; the display device further includes a control panel chip connected to the display panel; and the signal processing device comprises: a third filter amplification module connected to each of the plurality of imaging devices, wherein the third filter amplification module is positioned to receive the plurality of fourth analog signals output by each of the plurality of imaging devices, and performs filter and amplification processing on the plurality of fourth analog signals to obtain a corresponding plurality of fourth intermediate signals; a third analog-to-digital conversion module connected to the third filter amplification module, wherein the third analog-to-digital conversion module is positioned to receive each plurality of fourth intermediate signals output by the third filter amplification module, and converts the received plurality of fourth intermediate signals into a corresponding plurality of fifth intermediate signals, where each of the plurality of fifth intermediate signals is a digital signal; and an image extraction module connected to each of the third analog-to-digital conversion module and the control panel chip, wherein the image extraction module generates, for each plurality of fifth intermediate signals respectively corresponding to each of the plurality of imaging devices, a second image corresponding to each of the plurality of imaging devices, extracts an overlapping portion of each second image to obtain a composite target image, generates a fourth display signal according to the composite target image, and transmits the fourth display signal to the control panel chip, where the control panel chip inputs the fourth display signal to the display panel to cause the display panel to display the composite target image.

In another example, a method of controlling an electronic device, the method comprising: receiving an imaging instruction; receiving, by way of one or more light-passing structures, an incident light; transmitting the incident light to a light-emitting side of each of the one or more light-passing structures; converting, by way of one or more imaging devices, the incident light into one or more analog signals in response to the imaging instruction; receiving, by way of a signal processing device, the one or more analog signals output by the one or more imaging devices; processing, by way of the signal processing device, the one or more analog signals to obtain a display signal; transmitting, by way of the signal processing device, the display signal to a display device; and displaying, by way of the display device, an image according to the display signal; wherein the electronic device comprises the display device; the one or more imaging devices; and the signal processing device; wherein the display device comprises a display panel and a non-display area at an edge of the display panel, the non-display area having the one or more light-passing structures, where each of the one or more light-passing structures comprises the light-emitting side facing an internal space of the electronic device; each of the one or more imaging devices respectively corresponds to one of the one or more light-passing structures, and is disposed on the light-emitting side of the corresponding light-passing structure, and converts the incident light into the one or more analog signals in response to the imaging instruction; and the signal processing device is connected to each of the display device and the one or more imaging devices.

It will be appreciated that the various embodiments of the present disclosure are described in a progressive manner, wherein each embodiment focuses on differences from other embodiments, and similar parts between the various embodiments may be referred to each other.

It will be appreciated that ordinal terms such as "first" and "second" are used merely to distinguish one entity or operation from another entity or operation, and do not necessarily require or imply any such actual relationship or order between these entities or operations.

FIGS. 1-14 and 16-23 show example configurations with relative positioning of the various components described herein. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

It is to be understood that the above embodiments are merely exemplary embodiments employed to explain the principles of the inventive concepts, but the inventive concepts are not limited thereto. Various modifications and improvements can be made by those skilled in the art without departing from the spirit and scope of the disclosure, and such modifications and improvements are also considered to be within the scope of the disclosure.

The invention claimed is:

1. An electronic device, comprising:
a display device;
one or more imaging devices; and
a signal processing device; wherein
the display device comprises a display panel and a non-display area at an edge of the display panel, the non-display area having one or more light-passing structures, where each of the one or more light-passing structures comprises a light-emitting side facing an internal space of the electronic device;
each of the one or more imaging devices respectively corresponds to one of the one or more light-passing structures and is disposed on the light-emitting side of the corresponding light-passing structure, the one or more imaging devices comprising at least one photosensor disposed such that an orthographic projection of the at least one photosensor is within the display panel, and the at least one photosensor receiving light output from at least one of the one or more light-passing structures; and
the signal processing device is connected to each of the display device and the one or more imaging devices,
wherein the display device further comprises a backlight module provided with a light-blocking plate near a side end of each of the one or more light-passing structures.

2. The electronic device of claim 1, wherein
each of the one or more light-passing structures transmits an incident light to the light-emitting side thereof;
the display device displays an image according to a first display signal sent by the signal processing device;
each of the one or more imaging devices is positioned to receive the incident light output by the corresponding light-passing structure, and converts the incident light into one or more first analog signals in response to an imaging instruction; and
the signal processing device is positioned to receive the one or more first analog signals output by any of the one or more imaging devices, processes the one or more first analog signals to obtain the first display signal, and transmits the first display signal to the display device.

3. The electronic device of claim 2, wherein each of the one or more imaging devices comprises:
a concentrating component disposed on the light-emitting side of the corresponding light-passing structure, wherein
the concentrating component comprises a light-emitting side, is positioned to receive the incident light output by the corresponding light-passing structure, concentrates the incident light, and outputs the concentrated light to the light-emitting side thereof; and
a first photosensor disposed on the light-emitting side of the concentrating component, wherein
the first photosensor is positioned to receive the concentrated light output by the concentrating component, and converts the concentrated light into the one or more first analog signals in response to the imaging instruction.

4. The electronic device of claim 3, wherein
the concentrating component is positioned to receive the incident light output by the corresponding light-passing structure, concentrates the incident light into a parallel light beam, and outputs the parallel light beam to the light-emitting side thereof; and
the first photosensor comprises a first light-receiving surface provided with a plurality of first photosensitive sites, where areas of the plurality of first photosensitive sites are equivalent to one another.

5. The electronic device of claim 3, wherein the concentrating component comprises one or more convex lenses.

6. The electronic device of claim 3, wherein
each of the one or more imaging devices further comprises an optical path adjusting component disposed between the concentrating component and the first photosensor, wherein
the optical path adjusting component is positioned to receive the concentrated light output by the concentrating component, performs optical path adjustment on the concentrated light, and transmits the adjusted light to the first photosensor; and
an orthographic projection of the first photosensor on the display panel at least partially overlaps a display area of the display panel.

7. The electronic device of claim 6, wherein the optical path adjusting component comprises one or more triangular prisms or one or more planar mirrors.

8. The electronic device of claim 1, wherein each of the one or more imaging devices comprises:
a second photosensor disposed on the light-emitting side of the corresponding light-passing structure, wherein
the second photosensor is positioned to receive the incident light from the corresponding light-passing structure, and converts the incident light into the one or more first analog signals in response to the imaging instruction.

9. The electronic device of claim 8, wherein the second photosensor comprises a second light-receiving surface provided with a plurality of second photosensitive sites, where areas of the plurality of second photosensitive sites gradually increase from a center of the second light-receiving surface to an edge of the second light-receiving surface.

10. The electronic device of claim 1, wherein each of the one or more light-passing structures comprises:
a first substrate;
a second substrate;
a first alignment film formed on a side of the first substrate facing the second substrate;
a second alignment film formed on a side of the second substrate facing the first substrate;
a liquid crystal layer disposed between the first alignment film and the second alignment film; and
a target polarizer disposed on a side of the first substrate facing away from the second substrate, or on a side of the second substrate facing away from the first substrate.

11. The electronic device of claim 1, wherein the display panel comprises a color filter substrate, where a black matrix of the color filter substrate is provided with one or more through holes for respectively forming the one or more light-passing structures, and an outer diameter of each of the one or more through holes is greater than or equal to 10 μm and less than or equal to 20 μm.

12. The electronic device of claim 1, wherein
the one or more imaging devices is one imaging device;
the one imaging device is positioned to receive a plurality of light components of different colors in the incident light output by the corresponding light-passing structure, and converts the plurality of light components into a corresponding plurality of second analog signals in response to the imaging instruction;
the display device further comprises a control panel chip connected to the display panel; and
the signal processing device comprises:
a first filter amplification module connected to the one imaging device, wherein
the first filter amplification module is positioned to receive the plurality of second analog signals output by the one imaging device, and performs filter and amplification processing on the plurality of second analog signals to obtain a corresponding plurality of first intermediate signals; and
a first analog-to-digital conversion module connected to each of the first filter amplification module and the control panel chip, wherein
the first analog-to-digital conversion module is positioned to receive the plurality of first intermediate signals output by the first filter amplification module, converts the plurality of first intermediate signals into a corresponding plurality of second display signals, where each of the plurality of second display signals is a digital signal, and transmits the plurality of second display signals to the control panel chip, where the control panel chip inputs the plurality of second display signals to the display panel to cause the display panel to display one or more images.

13. The electronic device of claim 1, wherein
the one or more imaging devices is a plurality of imaging devices;
a display area of the display panel is divided into a plurality of display sub-regions;
each of a plurality of images acquired by different imaging devices of the plurality of imaging devices respectively correspond to different display sub-regions;
an area of each of the plurality of display sub-regions does not overlap with an area of any other display sub-region;
each of the plurality of imaging devices is positioned to receive a plurality of light components of different colors in the incident light output by the corresponding light-passing structure, and converts the plurality of light components into a corresponding plurality of third analog signals in response to the imaging instruction;
the display device further includes a control panel chip connected to the display panel; and
the signal processing device comprises:
a second filter amplification module connected to each of the plurality of imaging devices, wherein
the second filter amplification module is positioned to receive the plurality of third analog signals output by each of the plurality of imaging devices, and performs filter and amplification processing on the plurality of third analog signals to obtain a corresponding plurality of second intermediate signals;
a second analog-to-digital conversion module connected to the second filter amplification module, wherein
the second analog-to-digital conversion module is positioned to receive each plurality of second intermediate signals output by the second filter amplification module, and converts the received plurality of second intermediate signals into a corresponding plurality of third intermediate signals, where each of the plurality of third intermediate signals is a digital signal;
an image-splicing module connected to each of the second analog-to-digital conversion module and the control panel chip, wherein the image-splicing module generates, for each plurality of third intermediate signals respectively corresponding to each of the plurality of imaging devices, a first image corresponding to each of the plurality of imaging devices, splices each first image together to obtain a panoramic image; generates a third display signal according to the panoramic image; and transmits the third display signal to the control panel chip, where the control panel chip inputs the third display signal to the display panel to cause the display panel to display the panoramic image.

14. The electronic device of claim 1, wherein
the one or more imaging devices is a plurality of imaging devices;
a display area of the display panel is divided into a plurality of display sub-regions;
each of a plurality of images acquired by different imaging devices of the plurality of imaging devices respectively correspond to different display sub-regions;
each of the plurality of display sub-regions has an overlap region with respect to another display sub-region;
each of the plurality of imaging devices is positioned to receive a plurality of light components of one of a plurality of colors in the incident light output by the corresponding light-passing structure, and converts the plurality of light components into a corresponding plurality of fourth analog signals in response to the imaging instruction;
the display device further includes a control panel chip connected to the display panel; and
the signal processing device comprises:
a third filter amplification module connected to each of the plurality of imaging devices, wherein
the third filter amplification module is positioned to receive the plurality of fourth analog signals output by each of the plurality of imaging devices, and performs filter and amplification processing on the plurality of fourth analog signals to obtain a corresponding plurality of fourth intermediate signals;
a third analog-to-digital conversion module connected to the third filter amplification module, wherein
the third analog-to-digital conversion module is positioned to receive each plurality of fourth intermediate signals output by the third filter amplification module, and converts the received plurality of fourth intermediate signals into a corresponding plurality of fifth intermediate signals, where each of the plurality of fifth intermediate signals is a digital signal; and
an image extraction module connected to each of the third analog-to-digital conversion module and the control panel chip, wherein
the image extraction module generates, for each plurality of fifth intermediate signals respectively corresponding to each of the plurality of imaging devices, a second image corresponding to each of the plurality of imaging devices, extracts an overlapping portion of each second image to obtain a composite target image, generates a fourth display signal according to the composite target image, and transmits the fourth display signal to the control panel chip, where the control panel chip inputs the fourth display signal to the display panel to cause the display panel to display the composite target image.

15. A method of controlling an electronic device, the method comprising:
receiving an imaging instruction;
receiving, by way of one or more light-passing structures, an incident light;
transmitting the incident light to a light-emitting side of each of the one or more light-passing structures;
converting, by way of one or more imaging devices, the incident light into one or more analog signals in response to the imaging instruction;
receiving, by way of a signal processing device, the one or more analog signals output by the one or more imaging devices;
processing, by way of the signal processing device, the one or more analog signals to obtain a display signal;
transmitting, by way of the signal processing device, the display signal to a display device; and
displaying, by way of the display device, an image according to the display signal; wherein the electronic device comprises:
the display device;
the one or more imaging devices; and
the signal processing device; wherein
the display device comprises a display panel and a non-display area at an edge of the display panel, the non-display area having the one or more light-passing structures, where each of the one or more light-passing structures comprises the light-emitting side facing an internal space of the electronic device;
each of the one or more imaging devices respectively corresponds to one of the one or more light-passing structures and is disposed on the light-emitting side of the corresponding light-passing structure, the one or more imaging devices comprising at least one photosensor disposed such that an orthographic projection of the at least one photosensor is within the display panel, and the at least one photosensor receiving light output from at least one of the one or more light-passing structures; and
the signal processing device is connected to each of the display device and the one or more imaging devices,
where in the display device further comprises a backlight module provided with a light-blocking plate near a side end of each of the one or more light-passing structures.

16. The electronic device of claim 6, wherein the orthographic projection of the first photosensor on the display panel is located entirely within the display area of the display panel.

17. An electronic device, comprising:
a display device, the display device comprising a display panel;
an imaging device, the imaging device comprising a photosensor; and
a signal processing device; wherein
the display panel has a display area and a non-display area, the non-display area being at an edge of the display panel;
a light-passing structure is disposed in the non-display area;
the imaging device is disposed under the display panel;
an orthographic projection of the photosensor on the display panel is located entirely within the display area of the display panel; and the signal processing device is connected to each of the display device and the imaging device, wherein the display device further comprises a backlight module provided with a light-blocking plate near a side end of each of the one or more light-passing structures.

18. The electronic device of claim 17, wherein the display device further comprises a control panel chip;

the signal processing device comprises a filter amplification module and an analog-to-digital conversion module;

the imaging device is disposed on a light-emitting side of the light-passing structure;

the filter amplification module is connected to each of the imaging device and the analog-to-digital conversion module;

the analog-to-digital conversion module is connected to the control panel chip; and the control panel chip is connected to the display panel.

\* \* \* \* \*